(12) United States Patent
Pinarello et al.

(10) Patent No.: US 11,504,808 B2
(45) Date of Patent: Nov. 22, 2022

(54) DEVICE AND METHOD FOR JOINING METALLIC TUBULARS OF DRILLING WELLS

(71) Applicant: INNOVATIVE WELDING SOLUTIONS B.V., Amsterdam Zuidoost (NL)

(72) Inventors: Giordano Pinarello, Amsterdam Zuidoost (NL); Alessandro Bailini, Amsterdam Zuidoost (NL)

(73) Assignee: INNOVATIVE WELDING SOLUTIONS B.V., Amsterdam Zuidoost (NL)

( * ) Notice: Subject to any disclaimer, the term of this patent is extended or adjusted under 35 U.S.C. 154(b) by 472 days.

(21) Appl. No.: 16/486,994

(22) PCT Filed: Feb. 13, 2018

(86) PCT No.: PCT/IB2018/050869
§ 371 (c)(1),
(2) Date: Aug. 19, 2019

(87) PCT Pub. No.: WO2018/150318
PCT Pub. Date: Aug. 23, 2018

(65) Prior Publication Data
US 2020/0016695 A1   Jan. 16, 2020

(30) Foreign Application Priority Data

Feb. 20, 2017   (IT) .......................... 102017000018811
Feb. 20, 2017   (IT) .......................... 102017000018859

(51) Int. Cl.
*B23K 26/282*   (2014.01)
*E21B 17/00*   (2006.01)
(Continued)

(52) U.S. Cl.
CPC ............ *B23K 26/282* (2015.10); *E21B 17/00* (2013.01); *B23K 2101/06* (2018.08); *E21B 19/16* (2013.01); *E21B 43/103* (2013.01); *F16L 13/02* (2013.01)

(58) Field of Classification Search
None
See application file for complete search history.

(56) References Cited

U.S. PATENT DOCUMENTS 6,036,076 A * 3/2000 Royle ................ B23K 37/0533
                                                  228/102
6,046,076 A * 4/2000 Mitchell ................ H01L 24/75
                                                  257/E21.511
(Continued)

FOREIGN PATENT DOCUMENTS

WO   WO-2017140805 A1 *  8/2017 ............. B23K 13/01

OTHER PUBLICATIONS

International Search Report and Written Opinion of the ISA for PCT/IB2018/050869 dated May 3, 2018, 11 pages.

*Primary Examiner* — Matthew Troutman
*Assistant Examiner* — Douglas S Wood
(74) *Attorney, Agent, or Firm* — Nixon & Vanderhye P.C.

(57) ABSTRACT

A method for joining metallic well tubulars to be lowered into a wellbore (4) comprises the steps of: a) providing a first well tubular (6) having an upper end surface (6a), and a second well tubular (7) having a lower end surface (7a); b) lowering the first well tubular (6) into the wellbore (4), leaving the upper end thereof outside the wellbore (4); c) setting the second well tubular (7) in an axially aligned position on the first well tubular (6), with the lower end surface (7a) of the second well tubular (7) set against the upper end surface (6a) of the first well tubular (6); d)

(Continued)

keeping the first and second well tubulars (6, 7) in said axially aligned position; e) welding the upper end of the first well tubular (6) to the lower end of the second well tubular (7), forming a circumferential weld bead (WL) in a position corresponding to said upper and lower end surfaces (6*a*, 7*a*); and f) lowering into the wellbore (4) the first well tubular (6) and the second well tubular (7) welded together. Step e) comprises the operations of: providing at least one laser welding head (13), configured for directing a laser beam (LB) towards a circumferential working zone (WA) that includes an upper end portion of the first well tubular (6) and a lower end portion of the second well tubular (7), the at least one laser welding head (13) being displaceable around the circumferential working zone (WA) according to a respective trajectory of revolution; providing at least one induction-heating device (141, 142), which is displaceable substantially according to the trajectory of revolution of the at least one laser welding head (13), the at least one induction-heating device (141, 142) being set upstream, respectively downstream, of the at least one laser welding head (13), with reference to the direction of revolution (R) of the at least one laser welding head (13); causing revolution of the at least one laser welding head (13) and revolution of the at least one induction-heating device (141, 142), in such a way that: the laser beam (LB) progressively forms the circumferential weld bead (WL); and the at least one induction-heating device (141, 142) supplies heat to a corresponding part (PH1, PH2) of the circumferential working zone (WA), which comprises respective parts of said upper and lower end portions of the respective first and second well tubulars (6, 7), before the laser beam (LB) reaches said corresponding part (PH, PH2), respectively after the laser beam (LB) has reached said corresponding part (PH1, PH2).

19 Claims, 10 Drawing Sheets

(51) Int. Cl.
    *E21B 19/16*      (2006.01)
    *F16L 13/02*      (2006.01)
    *B23K 101/06*      (2006.01)
    *E21B 43/10*      (2006.01)

(56) References Cited

U.S. PATENT DOCUMENTS

| | | | |
|---|---|---|---|
| 7,150,328 B2* | 12/2006 | Marketz | E21B 43/103 |
| | | | 138/155 |
| 2004/0232207 A1* | 11/2004 | Alford | B23K 20/02 |
| | | | 228/105 |
| 2007/0102404 A1 | 5/2007 | Hertzberg | |
| 2007/0158390 A1* | 7/2007 | Anderson | B23K 20/023 |
| | | | 228/101 |
| 2009/0134203 A1* | 5/2009 | Domec | B23K 20/1245 |
| | | | 228/2.1 |
| 2015/0196968 A1 | 7/2015 | Lehr et al. | |
| 2015/0251275 A1* | 9/2015 | Denney | B23K 26/282 |
| | | | 219/121.64 |
| 2016/0228993 A1* | 8/2016 | Grausgruber | C21D 9/50 |
| 2016/0265976 A1* | 9/2016 | Joyce | G05D 23/22 |
| 2017/0239745 A1* | 8/2017 | Zhai | B23K 9/235 |
| 2018/0117718 A1* | 5/2018 | Rajagopalan | B23K 9/0284 |

* cited by examiner

DEVICE AND METHOD FOR JOINING METALLIC TUBULARS OF DRILLING WELLS

This application is the U.S. national phase of International Application No. PCT/IB2018/050869 filed Feb. 13, 2018 which designated the U.S. and claims priority to IT Patent Application No. 102017000018811 filed Feb. 20, 2017 and IT Patent Application No. 102017000018859 filed Feb. 20, 2017, the entire contents of each of which are hereby incorporated by reference.

FIELD OF THE INVENTION

The present invention relates to techniques for sinking drilling wells, such as wells for extraction of oil, and has been developed with particular reference to mutual connection of metallic tubular bodies used in the construction of the aforesaid wells.

PRIOR ART

Extraction wells, in particular oil wells, are sunk starting from a process of drilling of the earth, aimed at definition of a generally vertical wellbore. As drilling proceeds in depth, it is necessary to protect the upper part of the wellbore both to prevent the collapse of its peripheral wall and to prevent possible infiltrations of water and/or oil, as well as to prevent suction of the drilling sludge. This step, which is referred to as completion of the well, is performed by lowering into the wellbore a certain number of metallic tubular bodies of circular section, known as "casings", which are usually made of steel. The number of the tubular bodies depends upon the depth of the well and upon the mining objectives, as well as upon the difficulties of drilling of the rocks.

The subsequent drillings, at increasingly greater depths, are carried out with chisel bits of ever smaller size so as to not to damage the internal walls of the tubular bodies that have already been laid. For this reason, the internal lining of the well, formed by the tubular bodies secured on one another within the wellbore, has a diameter decreasing upwards, and the number of tubulars lowered is limited by the progressive narrowing of the well. The diameter of the tubular bodies typically ranges from 10 to 100 cm, and their wall thickness typically ranges from 8 to 25 mm.

Currently, coupling of the tubulars is performed mechanically, via a threaded joint, employing one of the following possible types of connection: short round threads and couplings (CSG), long round threads and couplings (LCSG), buttress threads and couplings (BCSG), and extremeline threads (XCSG). Connections of a CSG LCSG and BCSG type make use of an additional length of tubular, usually referred to as "coupling", which is internally threaded and couples to the ends of the two tubes to be joined together, which are externally threaded. The threads have a circular profile (CSG LCSG) or a sawtooth profile (BCSG). The XCSG connection is, instead, obtained by threading, with a sawtooth profile, the internal end of one tubular and the external end of the other tubular to be coupled together, which are then directly screwed to one another.

The techniques of coupling of the tubular bodies or casings based on mechanical coupling via threaded joint present certain disadvantages.

In the first place, the cost of well tubulars is high, on account of the complexity of the machining operations required for threading. Indicatively, a threaded well tubular can cost up to 40% more than a corresponding non-threaded well tubular. In the second place, the presence of the ends threads of well tubulars complicates the operations of storage, transport, and laying of the tubulars themselves, in view of the need to protect their threaded ends. Also the operations of coupling between the various well tubulars, i.e., the fact that they have to be screwed together during laying, are complex on account of the large size of the bodies to be coupled together. In addition to this, provision of the thread implies a thickening of the end portions of the tubular bodies. This process, in addition to entailing further costs, increases the encumbrance within the wellbore, thus further reducing the useful section for lowering subsequent tubulars. The very presence of the thread represents a critical point in which mechanical stresses and corrosion phenomena are concentrated.

EP 396204 A discloses a technique for friction welding of tubular bodies or casings for a drilling well, according to which a ring of welding material is set between the two ends of the tubular bodies to be joined together, which are axially aligned vertically on top of one another. The ring is made to turn at a high speed and deformed in a radial direction so as to generate sufficient heat to bring about friction welding between the ring itself and the ends of the two tubular bodies. This solution proves complicated, as regards production of the welding device, which is relatively difficult to control, as regards management of the process temperature, and occasionally is also a source of surface irregularities at the joint, such as to impose the need for a subsequent finishing process.

Known from EP 958094 A is a technique of induction welding of tubular bodies for a drilling well. Also in this case a welding ring is set between the two ends of the tubular bodies to be joined together, which are axially aligned vertically on top of one another. The area of joining between the two tubular bodies is enclosed in a hermetic chamber, in which an inert gas is injected, and within the chamber induction coils are set, designed to heat the material of the welding ring up to melting point and thereby create a metallurgical bond between the ends of the tubular bodies. Also this solution proves complicated, in particular as regards production of the induction-welding device, which must also be prearranged for generating very high temperatures.

OBJECT OF THE INVENTION

In its general terms, the aim of the present invention is to solve the aforesaid drawbacks via a device and a methodology for welding well tubulars that are comparatively simpler than those envisaged according to the prior art. This aim is achieved, according to the present invention, by a device for joining well tubulars having the characteristics specified in the annexed claims. The claims form an integral part of the technical teaching provided herein in relation to the invention.

As will emerge more clearly hereinafter, according to a first aspect, the well tubulars are butt welded using a laser beam to obtain a mutual coupling thereof by means of fusion and resolidification of the interfaces of the tubulars themselves. In preferred embodiments, the process of laser welding is assisted by heating by means of one or more electromagnetic inductors, which are arranged so as to precede and/or follow the point of incidence of the laser beam in the area of the welding joint, with reference to the direction in which the weld proceeds. In this way, the inductor or inductors supplies/supply heat to the welding joint and/or to areas surrounding it, thereby preventing excessively fast cooling thereof.

According to a second aspect, the welding device is supported by a structure that is mounted movable between a resting position, generally at a distance from, and a working position, generally close to the ends of the two tubulars to be welded, displacement of the movable structure preferably occurring in a guided way in a direction substantially perpendicular to the axis of the wellbore.

BRIEF DESCRIPTION OF THE DRAWINGS

Further aims, characteristics, and advantages of the invention will emerge clearly from the ensuing detailed description, with reference to the annexed drawings, which are provided purely by way of non-limiting example and in which.

DESCRIPTION OF PREFERRED EMBODIMENTS OF THE INVENTION

Reference to "an embodiment", "one embodiment", "various embodiments", and the like, in the framework of the present description is meant to indicate that at least one particular configuration, structure, or characteristic described is comprised in at least one embodiment. Hence, phrases such as "in an embodiment", "in one embodiment", "in various embodiments", and the like, that may be present in various points of the description do not necessarily refer to one and the same embodiment, but may instead refer to different embodiments. Moreover, particular conformations, structures, or characteristics defined herein may be combined in any adequate way in one or more embodiments, even different from the ones represented. The reference numbers and spatial references (such as "upper", "lower", "top", "bottom", "front", "back", "vertical", etc.) used herein, in particular with reference to the examples illustrated in the figures, are only for convenience and hence do not define the scope of protection or the scope of the embodiments. In the figures the same reference numbers are used to designate elements that are similar or are technically equivalent to one another.

In the sequel of the present description, the so-called casings—i.e., the lengths or stretches of metal tubing used for forming the internal lining of the wellbore, as explained in the introductory part—will be defined for simplicity as "tubulars" or "well tubulars". It should also be noted that, in what follows, only the elements useful for an understanding of the invention will be described, taking for granted that the componentry of the drilling system (such as the systems for hoisting, rotation, and circulation, as well as the drilling string, the chisel bits, etc.) may be of any conception known in the sector.

Figure 1:
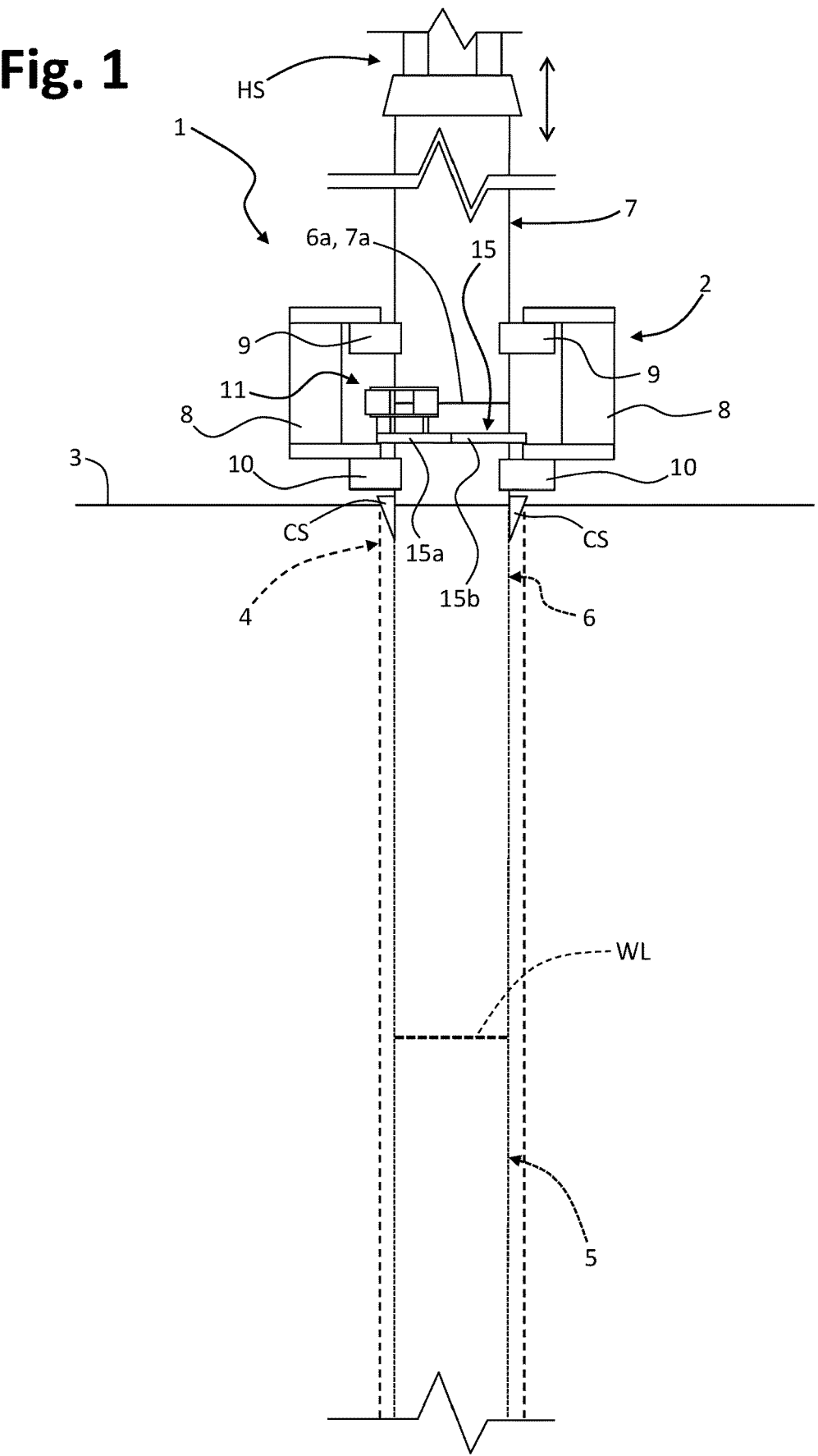
FIG. 1 is a schematic front view of a device for joining well tubulars according to possible embodiments of the invention.
Figure 2:
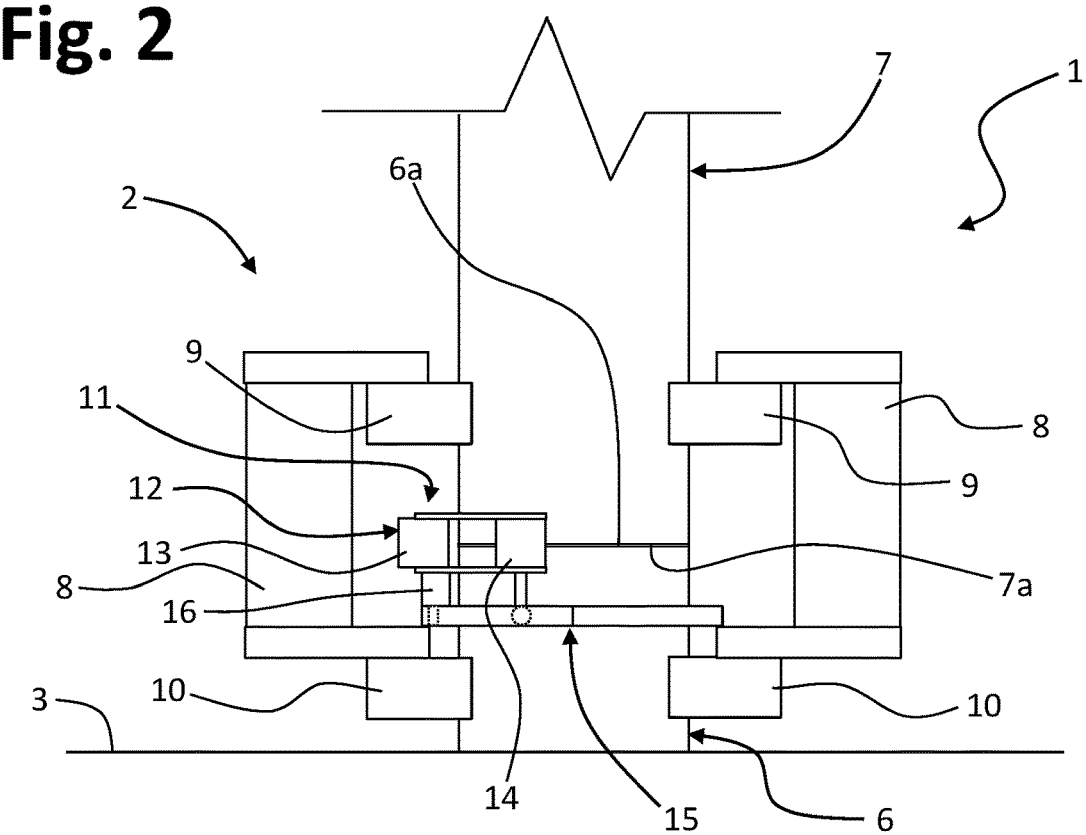
FIG. 2 is a detail of FIG. 1.
Figure 3:
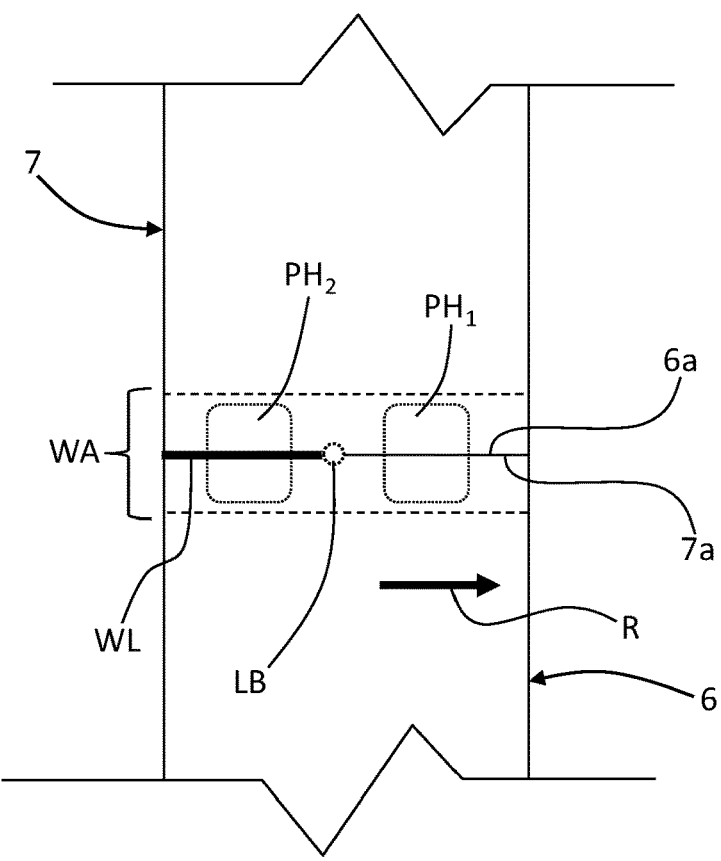
FIG. 3 is a schematic lateral view of two butt-coupled well tubulars, aimed at exemplifying the operating principle of a device according to possible embodiments of the invention.

With initial reference to FIGS. 1-3, designated as a whole by 1 is a device for joining metallic well tubulars, according to possible embodiments of the invention. In various embodiments of the present invention, the tubulars to be joined together are made of steel alloys suitable for supporting the potentially erosive and corrosive effect of agents of a chemical nature, such as sulphuric acid ($H_2S$), and agents of a mechanical nature, such as telluric movements even of slight degree. Among the preferential materials used for the purposes of implementation of the invention there may be included, for example, L80 and P101 steels and steels expressly referred to in the standard API 5CT (American Petroleum Institute Specification 5CT), incorporated herein for reference. The device and method described herein are in any case versatile and able to adapt both to different geometries and to different materials, via control of appropriate process parameters. In general terms, the well tubulars to be joined together have a substantially circular section, with a diameter of between 10 and 100 cm. The wall thickness of the tubulars is indicatively of between 8 and 25 mm.

In various embodiments, the device 1 has a load-bearing structure, designated as a whole by 2, which can be positioned on a rig floor 3 having an opening in a position corresponding to the upper opening of a wellbore 4, which is sunk in the earth and in which a plurality of metallic tubulars are to be lowered, according to what has been described in the introductory part of the present description. With reference to the non-limiting example illustrated in FIG. 1:

designated by 5 is a first metallic tubular already completely inserted and suspended in the wellbore 4;

designated by 6 is a second tubular partially inserted and suspended in the wellbore 4, the lower end of which is butt welded to the upper end of the tubular 5, via a circumferential weld bead WL; and designated by 7 is a third tubular, the lower end surface 7a of which is to be butt welded to the upper end surface 6a of the tubular 6, via a corresponding circumferential weld bead, and which is then to be lowered into the wellbore 4 in the position represented for the tubular 6.

As has been mentioned, when the well tubulars are to be installed in the wellbore 3 it is necessary to connect the tubulars themselves in series to one another, to form a string of tubulars, with the operation of connection that is performed in an area that is located a little above the rig floor 3. The process starts by lowering a first tubular (for example, the tubular 5) into the wellbore 4, for example using a hoisting system, and suspending it with respect to the rig floor 3 by means of a temporary holding device. Next, fixed to the upper end of the first tubular is the lower end of a second tubular (for example, the tubular 6), and the string thus formed is lowered into the wellbore 3, using the hoisting system, and is then again suspended, with the upper end portion of the second tubular that projects a little above the rig floor 3. Next, fixed to the upper end of the second tubular (for example, the end 6a of the tubular 6) is the lower end of a third tubular (for example, the lower end 7a of the tubular 7), with the string that is then again lowered and suspended for connection of a further tubular. The process continues in the same way until the desired length for the string of tubulars is obtained.

To be able to carry out these operations it is hence necessary to suspend temporarily each time the tubulars or series of tubulars already joined together (for example, the tubulars 5 and 6) at the level of the rig floor 3, using the holding device referred to. For instance, such a device may be of the type comprising purposely provided wedges, known as "slips", only some of which are represented in the figures, where they are designated by CS. These slips, set so as to form a sort of openable collar, are substantially metal segments, the outer profile of which has an approximately frustoconical shape and the inner profile of which is shaped (for example, via teeth or combs) for withholding the tubular that at the moment is projecting from the opening of the wellbore 4. The slips of the collar are positioned manually or via an actuator system at the opening in the rig floor 3, with their inner profile set against the outer surface of the tubular in question. Next, by lowering slightly the aforesaid tubular, for example using the hoisting system, the slips are forced to grip on the outer surface of the tubular itself, enveloping it and supporting it so as to grip it with respect to the rig floor 3. Then, when it is necessary to lower the string including a further tubular, the series itself is slightly lifted, via the hoisting system, so as to enable (manual or assisted) disengagement of the slips from the surface of the tubular previously withheld and thus be able to lower the string further, using the hoisting system. The slips are then re-positioned and a further slight lowering of the string enables a new gripping and a new suspension of the string itself. The process is repeated for each tubular of the string, until the desired length for the string of tubulars is installed in the wellbore 4.

In conformity with the invention, two successive tubulars that are to form part of the internal lining of the drilling well are positioned end-to-end against one another, preferably using a holding arrangement or system prearranged for ensuring concentricity and axial positioning between the tubulars themselves so as to limit formation of gaps or any excessive misalignment, thus guaranteeing the maximum interface between the end surfaces that are to be joined together.

The device according to the invention comprises a welding arrangement, which includes a movable welding assembly, which is displaceable substantially according to a circumference around the abutted ends of the tubulars to be joined together. In various embodiments, the movable welding assembly comprises a laser welding head. In accordance with the aforesaid first aspect, the welding assembly includes, in addition to a laser head, at least one heating inductor, such as one of a pre-heating inductor and a post-heating inductor, with the inductor or each inductor that is movable along the circumference followed by the laser head, for example to the right and/or to the left of the head itself. The welding assembly is prearranged for being positioned at the welding joint and is set in revolution around it so as to carry out a continuous circumferential weld. In the preferential embodiments cited just above, the laser head and the inductor or inductors turn together, i.e., are fixed in rotation with respect to one another.

In various embodiments, the structure 2 of the device 1 comprises a holding or centring arrangement, configured for keeping or blocking the tubulars to be welded in their axially aligned position, ensuring concentricity thereof. Preferentially, this arrangement includes at least first and second holding means, prearranged for blocking the tubular 6 and the tubular 7, respectively, in the aforesaid axially aligned position, after the lower end surface 7a of the tubular 7 has been set against the upper end surface 6a of the tubular 6.

In the non-limiting example illustrated, the structure 2 includes generally vertical uprights, designated by 8, which support, at different heights, first and second holding members 9 and 10, for example vice or jaw members. Preferentially, the holding members 9 and 10 are associated to a corresponding controllable (electrical, or hydraulic, or pneumatic) actuation system and can assume a corresponding operative position, for blocking the tubulars 6, 7 in position, and an inoperative position, for releasing the tubulars 6, 7, after these have been butt welded, and thereby enabling them to be lowered into the wellbore 4, as described previously. The movement of the upper tubular 7 into the vertical position where it is set on top of the tubular 6 and subsequent lowering of the string of tubulars 5, 6, and 7 is carried out using equipment and modalities in themselves known in the sector, for example a hoisting system or winch, represented schematically and designated by HS, with the aid of the aforementioned slip device CS.

The device 1 further comprises a welding arrangement, designated as a whole by 11, which is configured for forming the circumferential weld beads WL that join the various tubulars to be lowered into the wellbore 4 (i.e., with reference to the case exemplified, to form such a bead also at the upper and lower end surfaces 6a and 7a of the of the tubulars 6 and 7, respectively).

In preferential embodiments, the welding arrangement 11 comprises a movable welding assembly designated as a whole by 12 in FIG. 2, which includes at least one laser welding head 13. As said, in accordance with a first aspect, the welding assembly may include also at least one induction-heating device 14. The assembly 12 is movable in the sense that it is installed so that it can turn in a controlled way around a circumferential working zone, which includes the upper and lower end portions of two tubulars 6 and 7 to be joined together; this working zone is denoted as a whole by WA in FIG. 3.

The welding arrangement 11 further comprises a driving system, which can be controlled for displacing the welding assembly 12 around the working zone WA according to a respective circular path or trajectory of revolution. In various embodiments, the driving system comprises a guiding support 15 for the assembly 12, and motor means 16 suitable for causing displacement of the welding assembly 12 on the support 15.

As exemplified in FIGS. 4-6 (where just the welding arrangement 11 is represented schematically), in various preferred embodiments, the welding assembly 11 comprises just one laser welding head 13 and two induction-heating devices, designated by $14_1$ and $14_2$, hereinafter defined for simplicity as "inductors".

In various embodiments, the laser welding head 13 is prearranged for focusing a power laser beam at a distance roughly comprised between 10 and 50 cm with respect to the surface being treated. The head 13 is connected via an optical fibre 13a (FIG. 4) to a generator of the laser radiation (designated by LG in FIG. 8), for example a fibre-laser or disk-laser generator having a modulatable power preferably of between 5 and 40 kW. The welding head 13 preferably includes a focusing system of its own that can be controlled, according to a technique in itself known.

Also the electrical inductor or inductors $14_1$ and $14_2$ possibly used can be built according to a technique in itself known, and comprise, for example, inductor windings supplied by banks of power transformers and converters.

Figure 5:
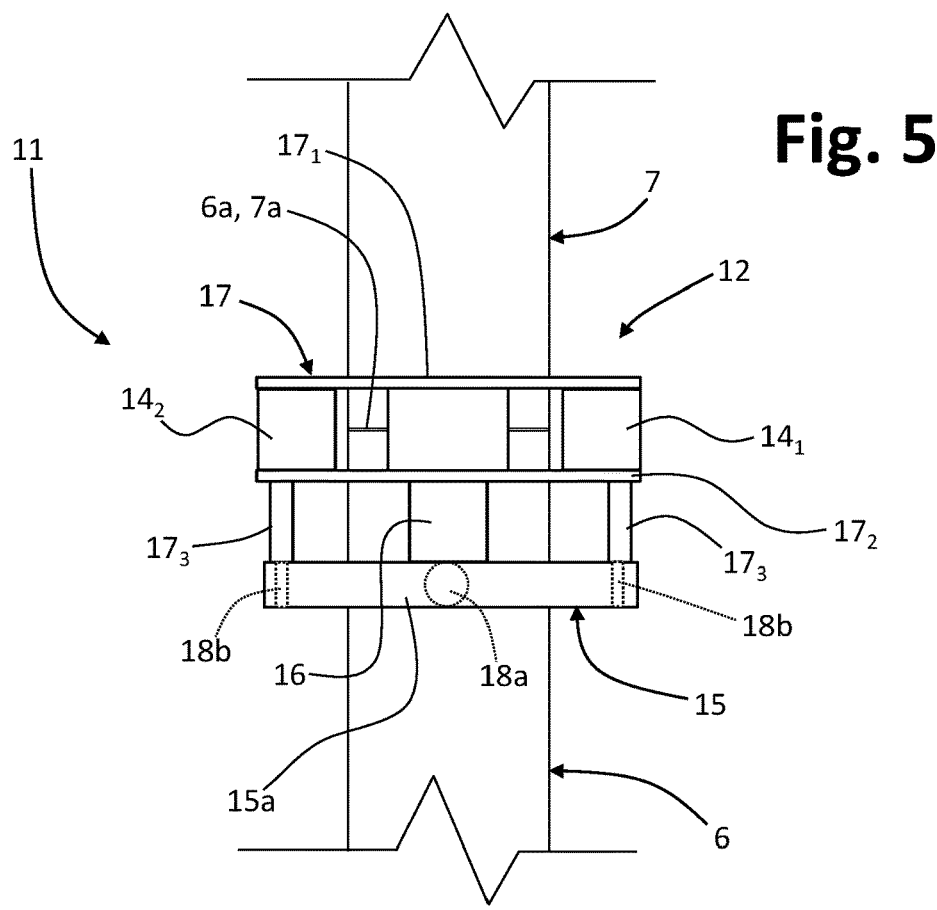
FIGS. 5 and 6 are schematic views, a front view and a lateral view, respectively, of a welding arrangement of a device according to possible embodiments of the invention.
Figure 6:
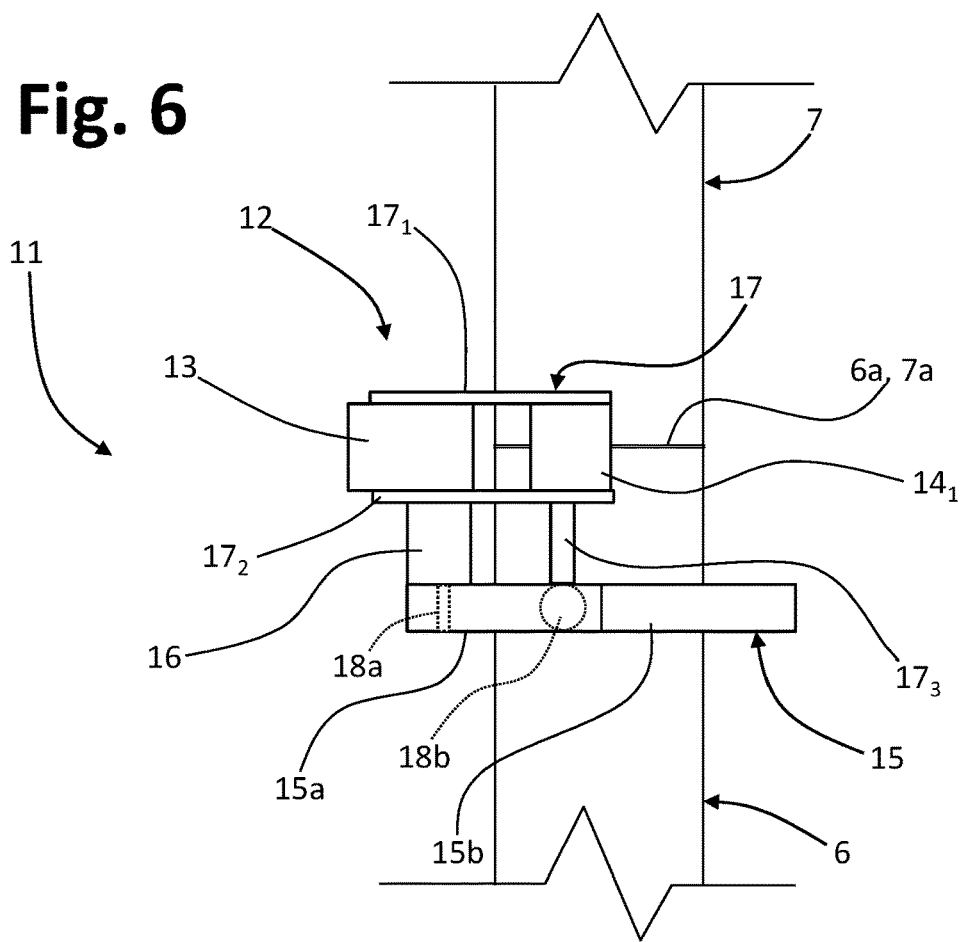

Preferentially, the laser welding head 13, and possibly the at least one inductor $14_1$ and/or $14_2$, is supported by one and the same displaceable structure, denoted as a whole by 17 in FIGS. 5-6, for example a metal frame. In the non-limiting example illustrated, the structure 17 includes an upper metal plate $17_1$ and a lower metal plate $17_2$ fixed between which are the laser welding head 13 and each inductor $14_1$ and/or $14_2$. Obviously, the structure 17 may be built in a way different from what has been exemplified.

The laser welding head 13 is prearranged for directing a laser beam LB (FIG. 4) towards the circumferential working zone WA, in particular in a position corresponding to the surfaces 6a, 7a that are set against one another. The at least one inductor $14_1$ and/or $14_2$, when it is envisaged, is prearranged for supplying heat—via a respective electromagnetic-induction field $EW_1$ and/or $EW_2$ (FIG. 4)—to a corresponding part of the working zone WA, i.e., both to the tubular 6 and to the tubular 7, in the example here considered.

In conformity with the aforesaid first aspect, the at least one inductor $14_1$ and/or $14_2$ is set so as to move upstream (i.e., to precede) or else downstream (i.e., to follow) the laser welding head 13, with reference to the direction of revolution of the assembly 12, i.e., the direction in which the laser welding proceeds. In the case exemplified—and with reference to FIG. 4 where the direction of revolution of the assembly is counterclockwise, as indicated by the arrow R—the inductors $14_1$ and $14_2$ hence move upstream (precede) and downstream (follow) the laser head 13, respectively. For this purpose, in the example illustrated, the at least one inductor is fixed in rotation with respect to the head 13; i.e., it is mounted on one and the same assembly or unit 12 together with the welding head 13.

The control system of the device 1 forming the subject of the invention is configured for controlling the welding arrangement 11, in particular the welding assembly 12 and its driving system 15-16 in such a way that, following upon revolution of the assembly 12 around the ends of the tubulars 6, 7 to be joined together:

the laser beam LB emitted by the head 13 progressively forms the corresponding weld bead WL, and, if the laser welding is assisted by electromagnetic induction, the electromagnetic field EW generated by the at least one inductor $14_1$ and/or $14_2$ supplies heat to a corresponding part of the working zone WA before the laser beam LB reaches this part and/or, respectively after the laser beam LB has reached this part. Preferentially, as has been said, the inductor or inductors are not moved in an independent way, but are fixed, in revolution, with the laser head so as to guarantee at each point of the welding joint the same profile of supply of heat.

In order to better clarify the concept of laser welding assisted by electromagnetic induction, reference may be made to FIG. 3, where the representation of the device according to the invention has been omitted for reasons of clarity. In this figure, WA indicates the aforementioned working zone or region, which includes the ends of the tubulars 6 and 7 set against one another, with the corresponding surfaces 6a and 7a substantially in contact with one another. In applications of the type illustrated, the surfaces 6a and 7a are preferentially machined so as to present a flat edge in order to maximise the areas of interface between the ends of the tubulars 6 and 7.

The welding assembly 12 is made to turn substantially about the axis X (FIG. 4) of the two tubulars axially aligned on one another (i.e., the axis of the wellbore 4), so that the laser beam LB, focused according to a technique in itself known, forms progressively the weld bead LW in a position corresponding to the surfaces 6a, 7a. In the course of revolution of the assembly 12, the inductor $14_1$ heats (pre-heats) a certain part—represented schematically and designated by $PH_1$ in FIG. 3—of the working zone WA, before the laser beam impinges upon it to form the weld at the surfaces 6a, 7a. At the same time, the inductor $14_2$ heats (post-heats) another part—represented schematically and designated by $PH_2$ in FIG. 3—of the working zone WA, which has already been impinged upon by the laser beam LB. Of course, FIG. 3 illustrates a static condition, so that it is to be assumed that in actual fact that the beam LB and the areas of inductive heating $PH_1$ and $PH_2$ displace continuously towards the right, as viewed in the figure, and that likewise the weld bead WL also "lengthens" progressively towards the right).

The presence of the inductor or of each inductor enables control of supply of heat to the welding joint so as to prevent excessively fast cooling thereof. The laser welding used according to the invention, as compared to traditional arc-welding techniques, in fact guarantees a high supply of heat in a small area of material that comprises the molten zone. As the laser beam LB advances along the joint, the molten bath cools rapidly, transferring energy to the two tubulars 6, 7 by conduction. The presence of a microstructure different from that of the base material, with different mechanical properties, can thus give rise to phenomena of cracking and brittle fracturing, if subjected to stress. For this reason, according to preferential embodiments of the invention, laser welding may be aided by the system for supply of heat by induction, which enables heating of the regions of the tubulars close to the welded area; in this way, cooling of the welded area is slowed down by the presence of a surrounding heat pool and occurs in a more gradual way, countering formation of undesirable metallurgical phases.

Figure 7:
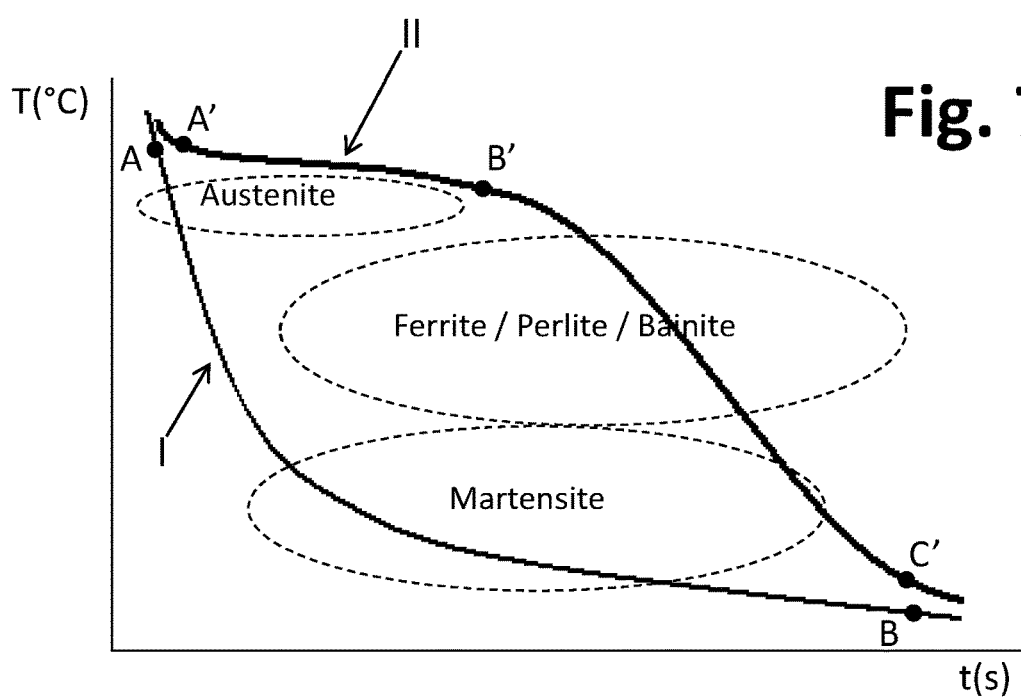
FIG. 7 is a CCT (Continuous Cooling Transformation) diagram that sets in comparison the dynamics of cooling of a typical laser weld with the dynamics of cooling followed by a welding process carried out according to the invention.

The CCT diagram of FIG. 7 shows the relation between cooling rate in a certain temperature range and microstructure originated for a generic steel. It should be noted that this diagram is only representative of the phenomena of microstructural transformation that occur in the steel during cooling and does not intend to be exhaustive of all the existing types of steel. The curve designated by I represents the typical dynamics of cooling that follows classic laser welding. The curve designated by II represents, instead, a cooling profile in a process assisted by induction, as in the aforesaid preferential embodiments of the invention. As may be noted, in the case of the curve I, there is a rapid cooling of the material after welding, between points A and B.

Following upon this cooling, the material may present a high fraction of microstructures with high hardness and hence present a brittle behaviour. On the other hand, in the case of the curve II, the stretch from A' to B' represents the mild cooling favoured by the use of the inductors, which heat the metal material before and/or after laser welding. Once the application of heat by induction is removed, there is a return to a faster cooling profile, as highlighted by the stretch B'-C'. Following upon this cooling, the material may present a microstructural composition adequate for withstanding the mechanical loads in situ.

Figure 4:
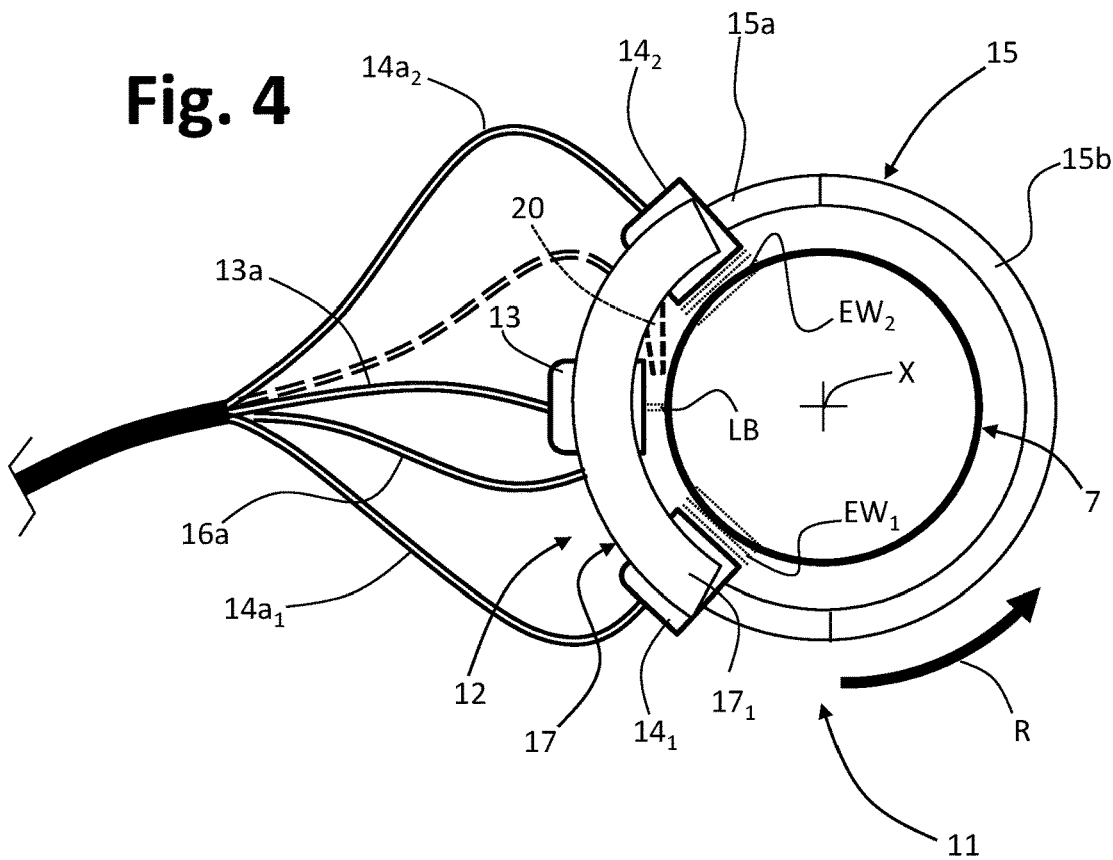
FIG. 4 is a schematic top plan view of a welding arrangement of a device according to possible embodiments of the invention.

FIGS. 4-6 are schematic illustration provided merely by way of example of a possible configuration of the welding arrangement 11 of FIGS. 1 and 2. The structure 17 of the welding assembly 12, associated to which in this case are the laser welding head 13 and the inductor or inductors $14_1$ and/or $14_2$, preferably has a generally semicircular shape, or is in any case equipped so as to surround at least part of the circumference of the tubulars 6, 7 in the working zone WA (FIG. 3) so that the laser head and the at least one inductor can follow in revolution the zone to be welded. The structure 17 is hence set in revolution in a way substantially centred on the axis X of FIG. 4. Preferentially, the movement of revolution of the structure 17 is guided by means of a guiding support 15, which in the example has a substantially circular shape and surrounds the tubulars 6, 7. The guiding support 15, for example supported by means of the load-bearing structure 2 itself of the device 1, may be equipped with articulated joints or couplings that enable opening thereof along its circumference and positioning thereof around the tubulars 6, 7. In the example illustrated, the support 15 comprises for this purpose two substantially semicircular parts 15a and 15b. Obviously, also other configurations are possible for the support 15, even in more than two parts.

Associated to either the structure 17 or the guiding support 15 are motor means, which can be controlled for causing movement of the former along the circular path defined by the latter. In the non-limiting example illustrated, for example, associated to the structure 17 is an electric motor 16, designed to bring about rotation of a rolling member 18a engaged in a corresponding guide defined by the support 15. The member 18a may be a motor-driven gear wheel, engaged in a rack with annular development that defines the circular path of movement for the welding assembly 12. The structure 17 may include further elements for coupling to the guiding support 15, such as uprights $17_3$ associated to one of the plates of the structure 17 and bearing respective rolling members 18b mounted idle and engaged in the annular guide defined by the support 15.

In the case exemplified, the guiding structure 15 is positioned underneath the welding joint, i.e., below the end surfaces 6a, 7a of the tubulars 6, 7: clearly it could, however, be positioned above said surfaces 6a, 7a, so as to support the assembly 11 from above, in a substantially suspended condition. According to other embodiments, the guiding structure 15 may be prearranged to have parts that extend, respectively, below and above the surfaces 6a, 7a, for example associated to the outer surfaces of the tubulars 6, 7, to obtain a more stable configuration.

Figure 8:
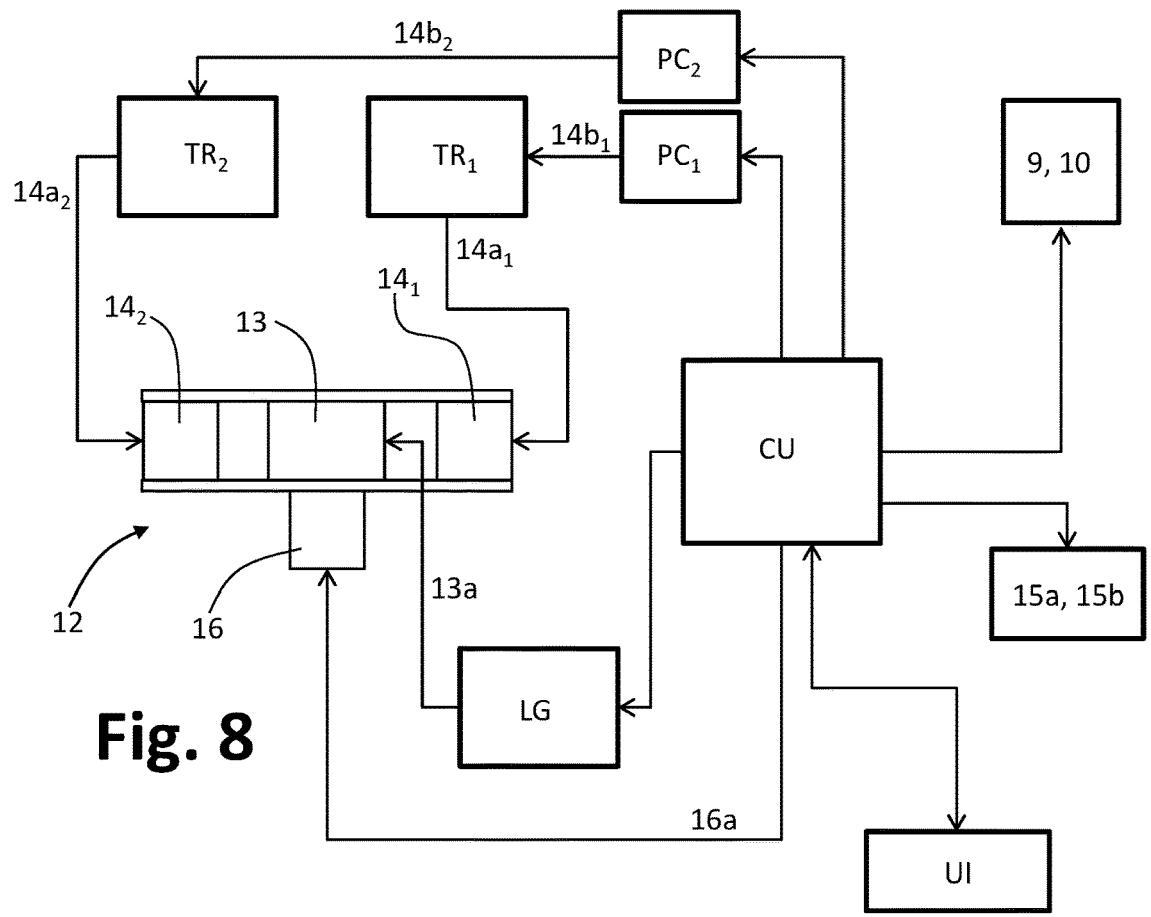
FIG. 8 is a simplified block diagram of a possible control circuit of a welding arrangement of a device according to possible embodiments of the invention.

The laser radiation is generated by means of a known laser generator designated by LG in FIG. 8, for example a fibre-laser generator or a disk-laser generator—and is carried to the welding head 13 via an optical fibre, designated by 13a also in FIG. 4. In this way, the generator LG may be located in a remote position, even several tens of metres, from the laser welding head 13 and, in general, from the welding arrangement 11, in any case enabling revolution of the assembly 12. For this purpose, of course, the length of the optical fibre 13a and its supporting/guiding system will be configured for enabling at least one complete revolution of the assembly 12 around the tubulars to be welded. Also each inductor $14_1$ and/or $14_2$, when envisaged, is connected to a corresponding supply system by means of cables of adequate length and supported/guided in an appropriate way to enable revolution of the assembly 12.

In various embodiments, for example as represented in FIG. 8, each inductor $14_1$ and/or $14_2$ is connected by means of suitable wiring $14a_1$ and/or $14a_2$ to a corresponding transformer $TR_1$ and/or $TR_2$, which is in turn connected by means of cables $14b_1$ and/or $14b_2$, for example coaxial cables, to a corresponding power converter $PC_1$ and/or $PC_2$. Also in this case, the possibility of locating at least part of the induction system in a position remote from the welding arrangement 11 enables greater flexibility of the process and simplifies installation in situ of the device 1.

FIG. 8 illustrates in a simplified form also a possible control architecture of a device 1 according to the invention. In this figure, designated by CU is a control unit of the device, preferably a microprocessor-equipped control unit, in which the control logic of the device 1 is implemented. Connected to the unit CU is a suitable user interface UI, for example of a touch-screen type, for display and setting of operating parameters of the process.

The unit CU is prearranged for controlling the generator LG of laser radiation, that, as has been said, is carried to the laser welding head 13 via an optical fibre 13a. The unit CU is likewise prearranged, via suitable wiring 16a, for control of the motor means 16 that determine revolution of the assembly 12, and possibly for control of each power converter $PC_1$ and/or $PC_2$, which, via the corresponding transformer block $TR_1$ and/or $TR_2$ enables supply of the corresponding inductor $14_1$ and/or $14_2$. In various embodiments, the unit CU is also prearranged for control of the holding systems 9 and 10, when these are of a motor-driven and controllable type. In various embodiments, also the parts 15a and 15b of the guiding support can be moved between their closed position (see, for example, FIGS. 1 and 4) and a respective open position (see, for example, FIGS. 10 and 11) via a controllable (electrical or hydraulic or pneumatic) actuation system: also such an actuation system can be controlled by means of the unit CU.

In various embodiments, the structure 17 and/or the guiding support 15 are prearranged for enabling regulation of the operating position of each inductor $14_1$ and/or $14_2$ relative to the tubulars to be welded and/or relative to the laser welding head 13. In various embodiments, for example, regulation of the radial position of each inductor, i.e., its distance from the outer surface of the tubulars 6 and 7, is envisaged, this distance being directly proportional to the heating efficiency. In addition or in combination, in various embodiments, regulation of the position of each inductor $14_1$ and/or $14_2$ along the welding circumference, i.e., of its distance from the laser head 13, is envisaged, this distance having an effect on the dynamics of heating of the tubulars 6, 7 in the region of the working zone WA. These controls of position may be of a manual type, for example obtained by mounting each inductor on the assembly 12 via corresponding supports that can be regulated manually in one or more spatial directions, or else these supports may be motor-driven and be controlled via the unit CU and the interface UI.

The parameters that can be controlled via the interface UI in relation to welding may preferentially comprise the power of the laser beam, the speed of displacement of the head 13 (i.e., of the assembly 12), and the focal depth of the laser beam, which may preferentially be selected on the interface UI on the basis of the physical properties of the material of the tubulars to be welded and their thickness.

Welding may be carried out using a single laser beam LB, or else using a laser beam split optically into two downstream of the collimator that equips the head 13, or else again using multiple laser beams, even with different powers. For this purpose, the welding assembly 12 may comprise even more than one laser head 13. The laser beam, or each laser beam, may be perpendicular to the surface of the tubulars to be welded or describe an angle with respect to it in three dimensions.

The welding system may be configured—as in the example represented in the figures—in such a way that the laser beam LB follows the linear path of the welding joint (i.e., the outer profile of the surfaces 6a, 7a), but in possible variant embodiments welding may be carried out by defining patterns about the joint with a certain periodicity (laser wobbling). For these cases, on the structure 17 of the welding assembly 12 there may be provided a suitable controllable movement system—of a conception in itself known—for the laser head 13 or for its focusing system, managed by the unit CU.

According to possible embodiments, the welding assembly 12 may be equipped with an optical system for tracking the welding joint (for example, based upon the use of at least one camera), for monitoring and possibly correcting in real time the path of the laser beam. It is also possible to implement systems for monitoring the welding process (for example, thermal cameras and/or spectroscopic sensors), which, via analysis of appropriate parameters (such as temperature distribution or spectroscopic analysis of the plasma emitted by the weld), yield a feedback that can be used for assessing the quality of the welded joint.

As regards possible supply of additional heat, in various embodiments, the control unit CU is prearranged for enabling control of each inductor in an independent way in order to generate a profile of heat supply that will enable a given metallurgical composition of the welding joint to be obtained on the basis of the desired process parameters and of the characteristics of the joint itself. Preferentially, the parameters that can be varied—for example via the interface UI—for control of the process of induction heating are the following:

the operating frequency, which determines the depth of penetration of the electromagnetic field, and hence the depth at which the induced currents that cause heating of the tubulars are generated: by lowering the frequency the depth of penetration is increased at the expense of an increase of the size of the system (in particular, of the power converters $PC_1$ and/or $PC_2$) and of a reduction of the efficiency; preferred operating frequencies for each inductor $14_1$ and/or $14_2$ for the purposes of implementation of the invention are comprised between 5 and 25 kHz;

the electric current, the intensity of which is directly proportional to the intensity of the induced field $EW_1$ and/or $EW_2$, and is hence correlated to the increase in temperature; the desired current intensity for the purposes of the specific implementation substantially depends upon the number of turns chosen for each inductor $14_1$ and/or $14_2$;

the sequence and duration of ON/OFF of each inductor; in the case of presence of a number of inductors it is preferable to be able to control each of them independently so as to guarantee that each point of the joint has, as far as possible, the same thermal profile.

As has been said, in the case of inductors mounted on the assembly via respective adjustable motor-driven supports, also their radial position and/or their distance from the laser head along the welding circumference may be controlled via the unit CU and/or the interface UI.

In conformity with the aforesaid second aspect, the welding device is supported by a structure mounted displaceable between an inoperative or resting position, generally far or at a distance from, and an operative or working position, generally close to the ends of the two tubulars to be welded, i.e., to the opening in the rig floor 3. The aforesaid displaceable structure, preferably of a motor-driven type, can be mounted movable on guides or tracks provided on the rig floor 3, or even be installed for being movable freely on wheels or the like directly on the rig floor 3.

Figure 9:
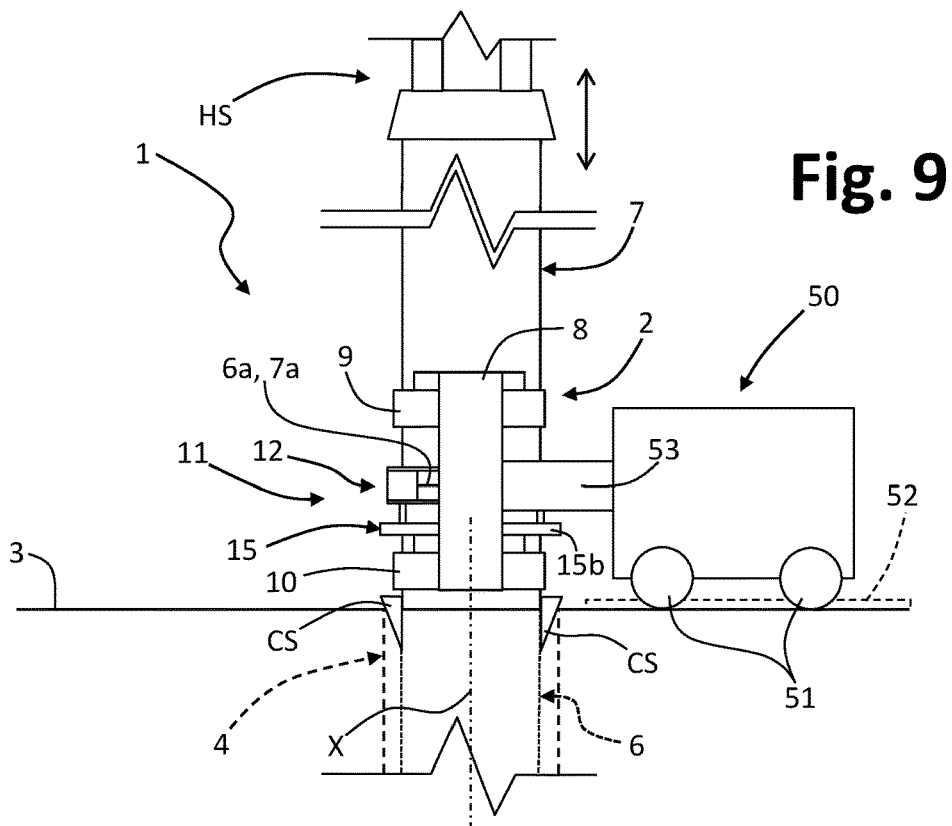
FIG. 9 is a partial and schematic lateral view of the device of FIG. 1 according to possible advantageous embodiments.

For instance, the device 1 described previously with reference to FIGS. 1-6 and 8 is supported by a movable structure, as illustrated schematically in FIG. 9. In this figure, the aforesaid movable structure—here in its operative position—is basically configured as a vehicle, designated as a whole by 50, which is provided with wheels 51 of its own. As mentioned, the wheels 51 may be engaged on corresponding guides or rails 52 fixed on the rig floor 3 in order to define the path of movement of the vehicle itself between the respective resting and working positions: for this purpose, the vehicle 50 is preferably equipped with motor means of its own. Displacement of the vehicle 50 occurs preferentially in a direction generally perpendicular to the axis X of the wellbore 4, i.e., of the tubulars to be butt-welded.

In the case exemplified in FIG. 9, the vehicle 50 is provided with generally parallel arms, one of which is designated by 53 in FIG. 9, which each support an upright 8, or in any case corresponding holding means 9, 10 (which, as has been said, may for example be vice or jaw elements), and preferably a respective part 15a or 15b of the guiding support 15 for the welding assembly 12. The arms 53 are displaceable between an open position, visible for example in FIG. 10, and a closed position, such as the one represented schematically in FIG. 4. In the open position, the arms 53 are divaricated, with the respective parts of the holding means 10, 11 and the two guiding parts 15a and 15b for the welding assembly 12 that are sufficiently distant from one another to enable displacement of the vehicle 50 between the resting and working positions. When the vehicle is in its working position, as in FIG. 9, the arms 53 can then be brought into the closed position, with the holding means 9, 10 that block the tubulars 6, 7 in position and with the two guiding parts 15a, 15b that surround completely the welding area, as described previously.

Figure 10:
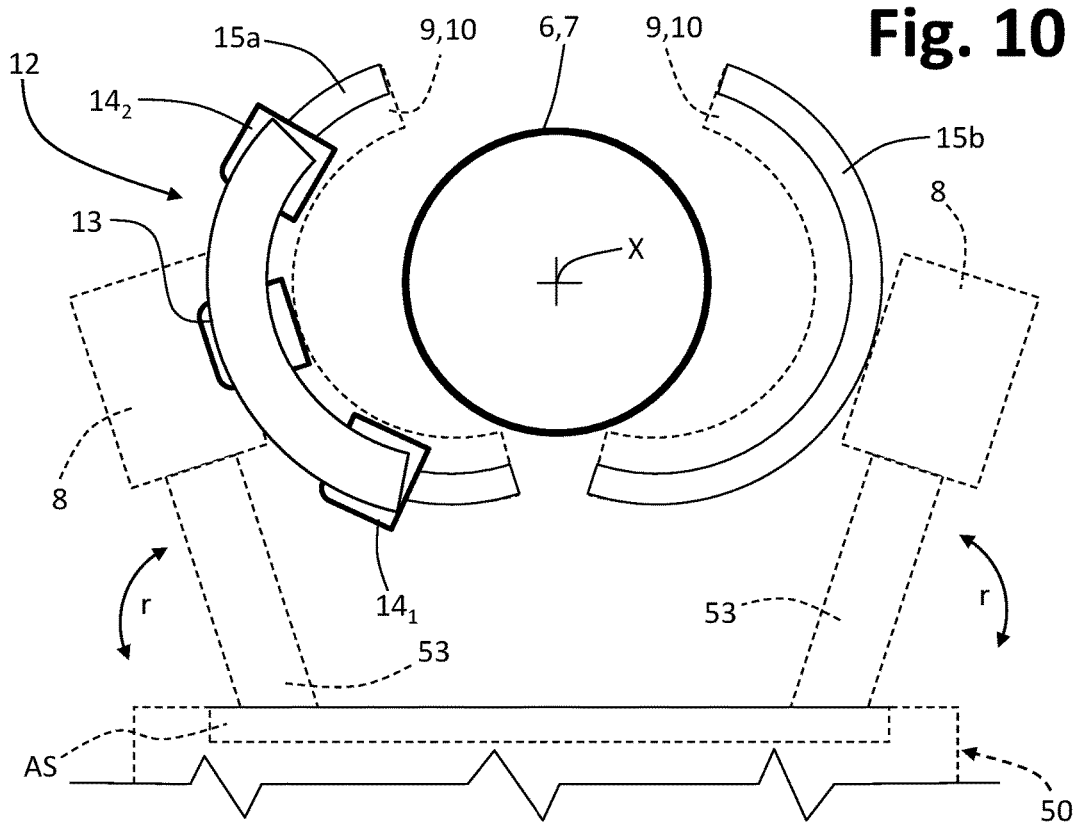
FIGS. 10 and 11 are partial and schematic top plan views of a welding arrangement of a device according to possible embodiments of the invention.
Figure 11:
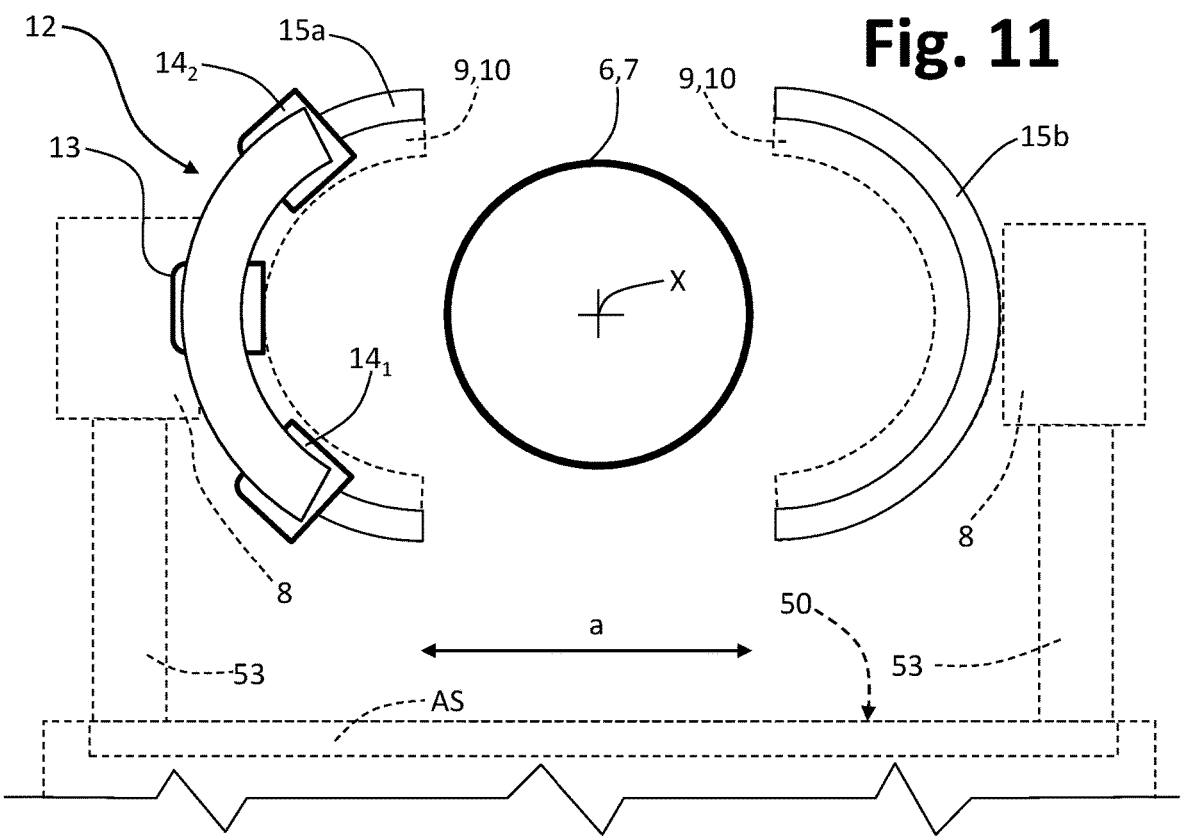

In the case exemplified in FIG. 10, the arms 53 are angularly movable between the open position and the closing position, as indicated by the arrows "r". On the other hand, in different embodiments, the arms 53 may be linearly movable between the aforesaid positions, as indicated by the arrow "a" in FIG. 11.

Preferentially, the arms 53—or similar structures that perform their function—are displaceable by means of a suitable controllable actuation system AS, for example of an electrical, hydraulic, or pneumatic type, provided on the vehicle 50. In various embodiments, the actuation system AS of the arms 53 is also conceived for enabling displacement in height of the arms, like a fork-lift truck.

In various embodiments, the vehicle 50 is provided with a recognition system in order to identify the position of the welding joint, i.e., the abutted ends 6a, 7a of the tubulars to be joined together. Such a system may, for example, be based upon the use of an optical sensor, or of a positioning laser, or of a camera-based system, in order to position the welding arrangement correctly with respect to the joint.

The vehicle 50 is preferably equipped with a driving logic that may be autonomous, supervised, or remote. In the case of autonomous logic, the displacements of the vehicle 50 are programmed and managed by a controller, for example the control unit CU itself of FIG. 8, in order to perform in a completely automated way at least the operations of displacement, as well as those of positioning and opening/closing of the arms 53. Also in the case of supervised logic, the vehicle 50 is programmed for performing autonomously its own operations, enabling, however, if need be, intervention on the part of an operator, for example by acting on the interface UI of FIG. 8. In the case of remote logic, the vehicle 50 is instead guided and/or controlled remotely by an operator.

Advantageously, on the vehicle 50 there can be installed at least some of the components of the power electronics for the laser head (such as the generator LG of laser radiation) and/or for the induction system, if such a system is envisaged (such as the transformers $TR_1$ and/or $TR_2$ for supply of the at least one inductor $14_1$ and/or $14_2$). On the vehicle 50 there may likewise be installed the system for cooling the laser head and/or the system for cooling the at least one inductor and/or systems for real-time measurement/control of the quality of the welding joint (such as the aforesaid optical joint-tracking system and/or the aforesaid system for monitoring the welding process).

Figure 12:
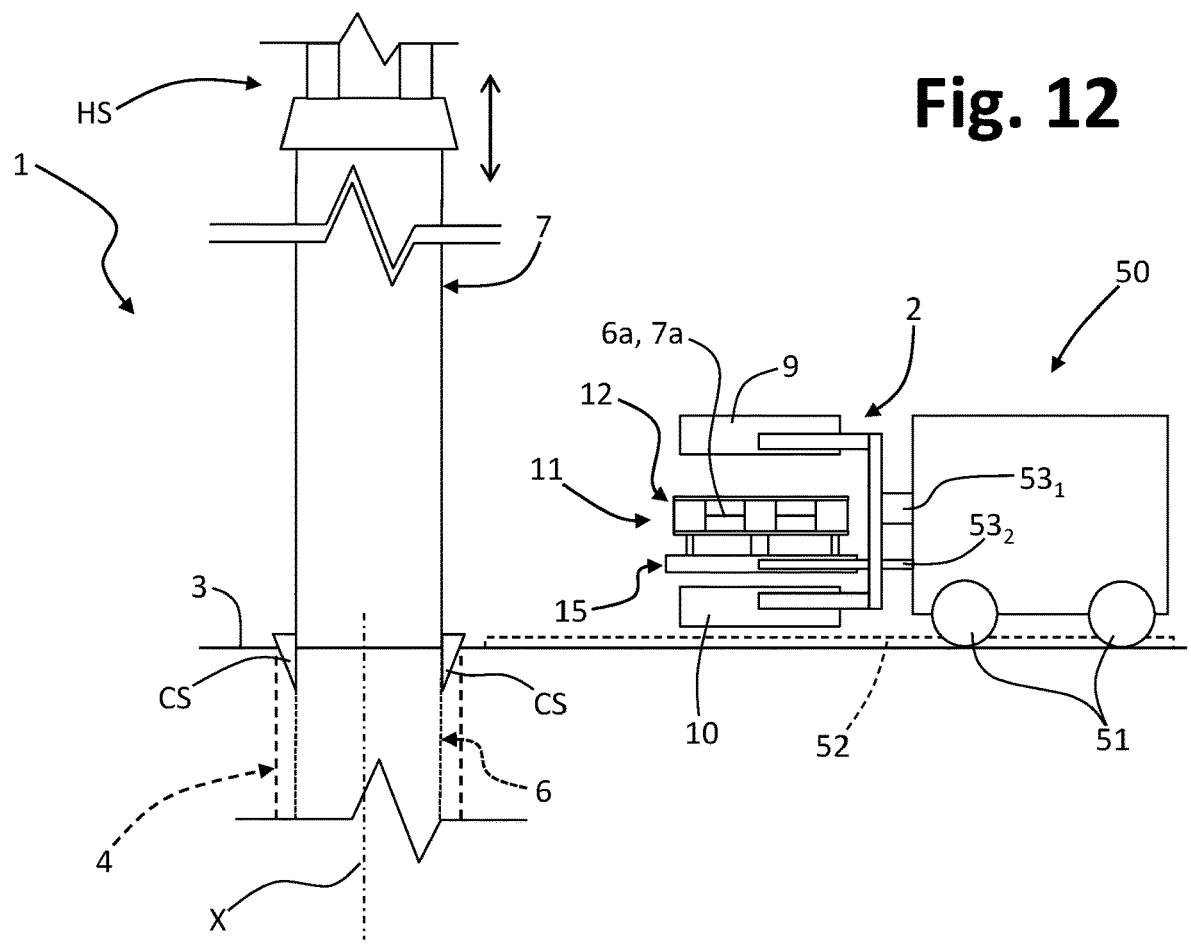
FIG. 12 is a view similar to that of FIG. 9, regarding further possible embodiments of the invention.

It will be appreciated that the configuration of the vehicle 50 or other movable structure may be different from the one exemplified previously, at the same time ensuring its functions of movement of the device 1 according to the invention. It is pointed out, for example, that in possible embodiments, the system for supporting the holding means 9, 10 and the system for supporting the guiding parts 15a, 15b for the welding assembly 11 can be controlled and/or driven in an independent way. Such a case is exemplified in FIG. 12, where the vehicle 50—represented in its inoperative or resting position—includes two arms $53_1$ (just one of which is visible) for support and movement of a respective part of the holding means 9, 10, and two arms $53_2$ (just one of which is visible) for support and movement of the respective guiding part 15a or 15b. Also in implementations of this type, the arms $53_1$ and/or $53_2$ are preferentially actuated by respective actuation systems.

A vehicle 50 or other movable structure that performs its functions can be used in all the embodiments described herein.

From the foregoing description, the characteristics of the present invention emerge clearly, as likewise do its advantages, which are mainly represented by:

process times that are shorter or in any case comparable to those of traditional fixing via screwing of the tubulars to be joined together;

elimination of the threading process and of the threads themselves, which entails both a reduction of the costs and processing times, and a reduction of the procedures for protecting the threads, which are also costly and complicated;

increase in safety, in so far as the discontinuity constituted by the thread is removed and is replaced by the welded joint, which can have mechanical properties altogether resembling those of the base material;

constructional simplicity and reduced overall dimensions of the welding arrangement.

A welding device according to the aforesaid second aspect can be easily positioned at the opening in the rig floor, thanks to the use of a structure or vehicle that supports the device itself in a movable way, thus simplifying the displacements thereof, which may be possibly controlled in an automatic and/or synchronised way with respect to other operations carried out in the course of laying of the well tubulars. This advantage may be further increased thanks to the implementation of a corresponding control system that may be in a position remote from the welding assembly. Moreover, part of the control componentry can be carried by the aforesaid vehicle or movable structure, when envisaged.

It will be clear to the person skilled in the art that numerous variations may be made to the device and method described herein by way of example, without thereby departing from the scope of the invention as defined by the annexed claims.

According to possible preferred variant embodiments, the laser-welding process can avail itself of a flow of gas (for example, argon, carbon dioxide, or nitrogen), which is blown via a nozzle and follows the welding profile so as to prevent contamination of the molten-metal bath by external atoms that may jeopardise the quality thereof. In addition or as an alternative, it is possible to provide a flow of gas for suppression of the plasma generated by the laser beam that ionises the air around the weld, given that this plasma could absorb part of the energy of the beam, hence reducing the efficiency of transmission. A nozzle for the aforesaid flow of inert gas or for the aforesaid flow of gas for suppression of plasma is represented schematically only in FIG. 4, where it is designated by 20.

According to possible variant embodiments, the welding assembly 12 comprises at least one inductor, set above or below the laser head 13, in addition or as an alternative to the inductor $14_1$ and/or $14_2$, in order to supply heat prevalently to just one of the two tubulars to be welded. This measure is not strictly necessary inductors, for instance when at least one inductor $14_1$ and/or $14_2$ is already provided which enable in any case simultaneous heating of the part of interest of both of the tubulars to be welded. Use of at least one further inductor for heating a respective tubular may, however, contribute, for tubulars of large thickness, for example greater than 10 mm, to slowing down further cooling of the tubular in question, after passage of the laser beam. In this perspective, it may hence prove useful to provide a further inductor higher up than the joint and a further inductor lower down than the joint in order to heat locally both of the tubulars to be joined together. Such a case is exemplified in FIG. 13, where designated by $14_3$ and $14_4$ are two further inductors, arranged on the structure 17, respectively, above and below the laser head 13. What has been described previously in relation to control of the inductors $14_1$ and/or $14_2$ may be applied also to the inductors $14_3$ and/or $14_4$.

In advantageous embodiments, the structure that supports the inductor or inductors provided has an overall annular shape, with the welding head that is preferentially set at the central opening of the shape. This type of embodiment is particularly advantageous when the movable welding assembly 12 includes two or more inductors.

Figure 13:
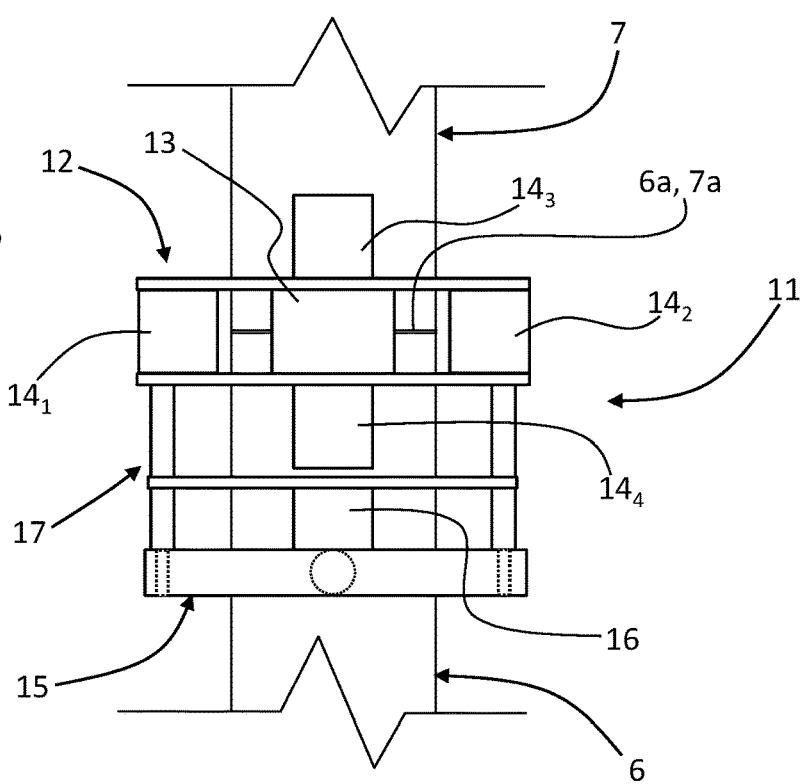
FIG. 13 is a view similar to that of FIG. 5, regarding possible variant embodiments of the invention.

Such a case is exemplified in FIG. 14, where the structure 17 of the welding assembly 12 includes an annular body 17', bearing the inductors $14_1$ and $14_2$, as well as inductors $14_3$ and $14_4$, which are functionally similar to those described with reference to FIG. 13. Obviously, it is possible to provide also just one of the inductors $14_1$ and $14_2$ and/or the inductors $14_3$ and $14_4$. Installed at the through opening of the annular body 17' is the welding head 13, which may be supported directly by the body 17' or else—as exemplified in FIG. 15—by other elements of the structure 17.

Figure 14:
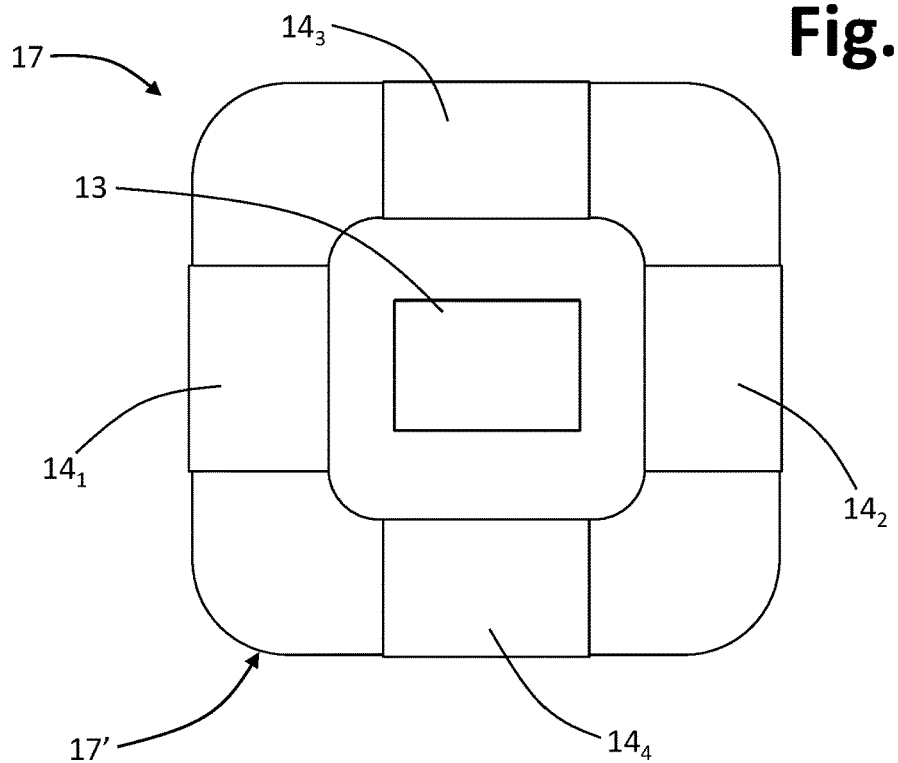
FIG. 14 is a schematic view in front elevation of an element of a welding arrangement of a device according to possible embodiments of the invention.
Figure 15:
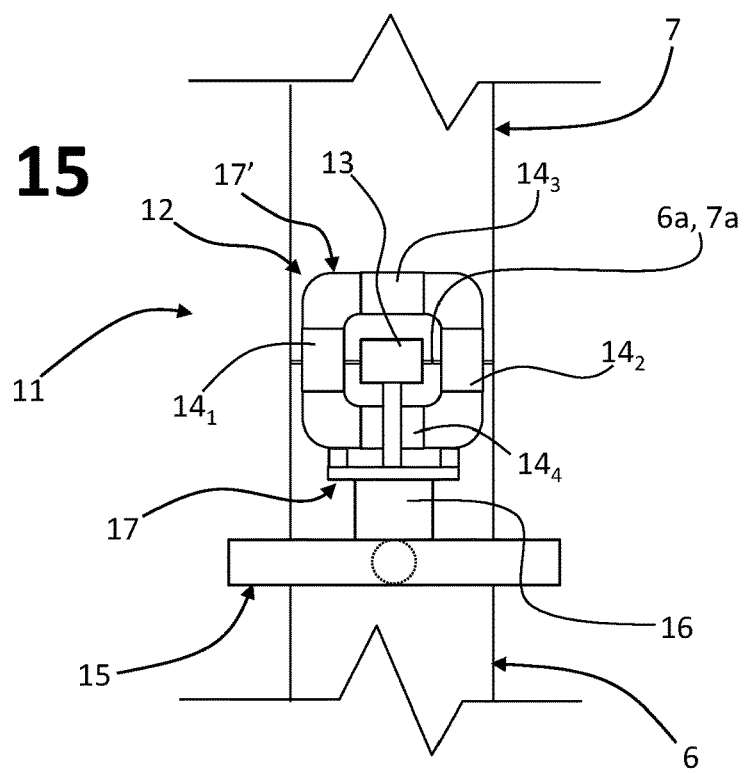
FIG. 15 is a view similar to that of FIG. 5, with the welding arrangement that includes the element of FIG. 14.

Solutions of the same type as those illustrated in FIGS. 14 and 15 may be implemented in all the embodiments described herein, also with just one of the inductors 14$_1$ and 14$_2$ and/or the inductors 14$_3$ and 14$_4$.

According to further possible variant embodiments, it is possible to envisage also addition of material in order to increase filling of the joint and counter the effect of undesirable gaps between the surfaces 6a, 7a, due for example to non-optimal machining of the edges, i.e., of the end surfaces 6a, 7a.

The addition of material may occur with cold wire, i.e., without application of heat. In this case, a metal wire, for example a steel wire, is set in a position corresponding to the outer profile of the joint, in order to be melted by the laser beam LB together with it. This technique may prove useful for welding tubulars with thicknesses of up to 15 mm.

Figure 16:
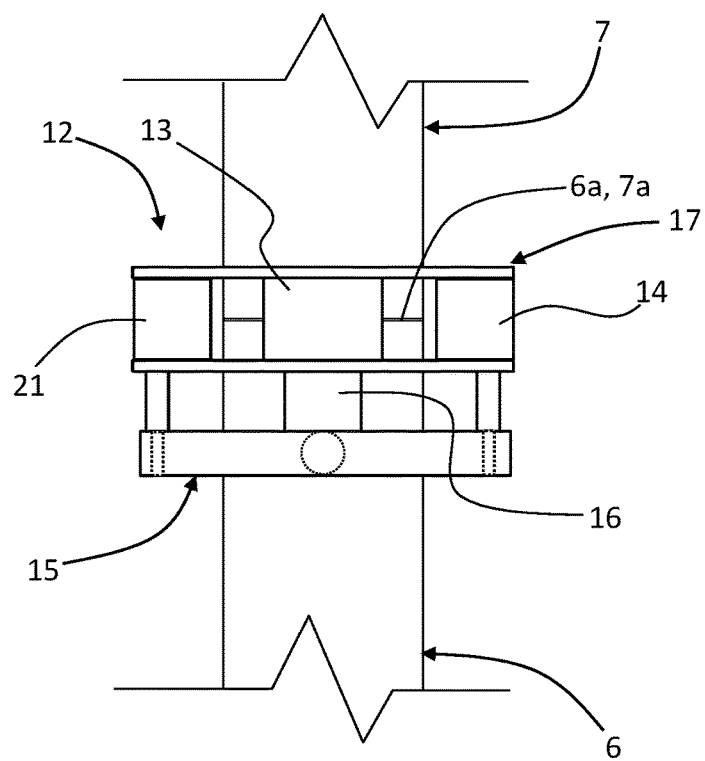
FIG. 16 is a view similar to that of FIG. 5, regarding a further possible variant embodiment of the invention.

Another possible configuration is represented schematically in FIG. 16, according to which there is envisaged addition of welding material with the use of a welding torch 21 equipped with a corresponding dispenser for bringing a metal wire to the joint, according to a technique in itself known. The welding torch 21 enables supply of further heat in addition to the heat of the laser emitted by the welding head 13 and enables supply of material to fill any possible gaps or misalignments. Of course, also in the case of FIG. 16 there may be envisaged at least one inductor, such as the one designated by 14 and/or an inductor above or below the head 13, in a way similar to what has been explained above in relation to FIG. 13 and/or FIG. 14.

With reference to the two variants just described, in the case where wire is used as additional welding material, it is expedient to machine the end surfaces 6a, 7a of the tubulars 6, 7 in order to define between them a groove on the outside in such a way that—when the tubulars themselves are positioned edge-to-edge the joint presents a sort of substantially V-shaped seat for receiving the wire.

Figure 17:
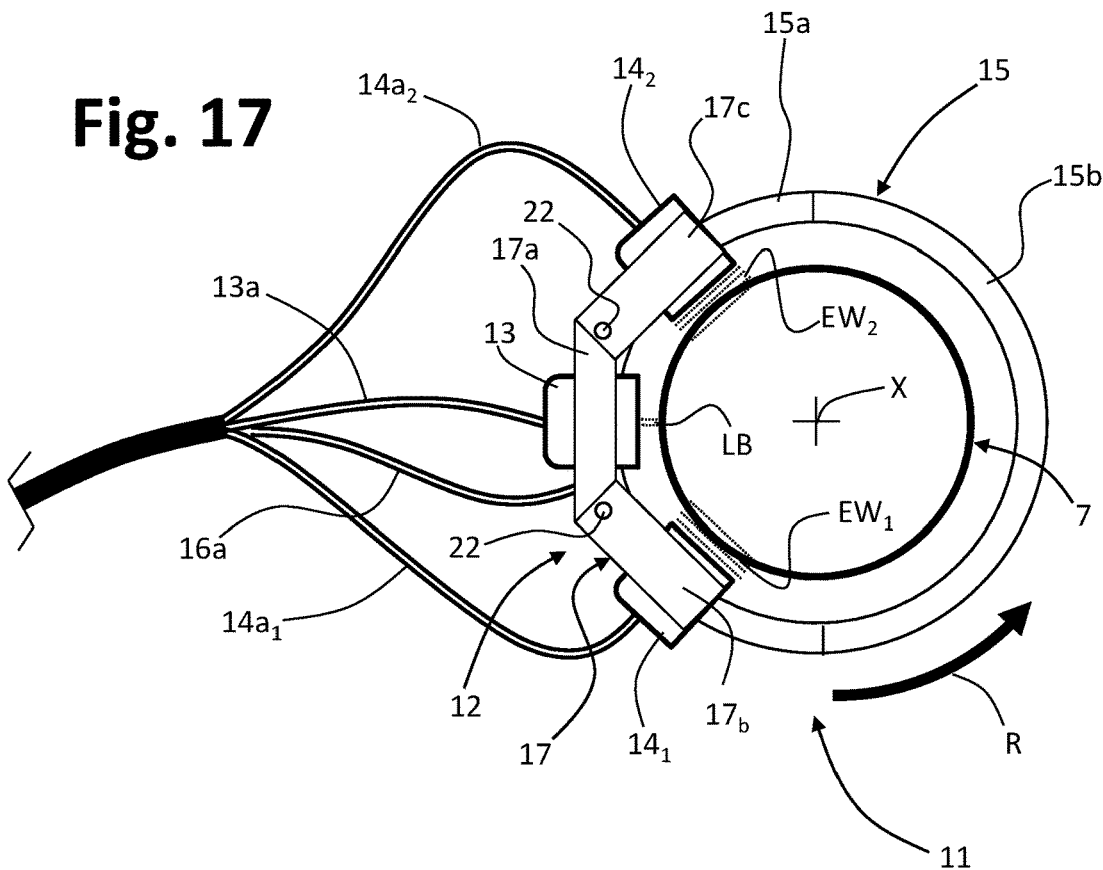
FIG. 17 is a view similar to that of FIG. 4, regarding a further possible variant embodiment of the invention.

FIG. 17 illustrates, with a view similar to that of FIG. 4, a further possible embodiment, according to which the structure 17 of the assembly 12 includes a plurality of parts articulated to one another by means of articulated joints or the like in order to enable adaptation of the operative configuration of the assembly itself to different diameters of tubulars to be welded together. In the example illustrated, there are provided at least one central part 17a, associated to which is the laser welding head 13, and at least two lateral parts 17b and 17c, associated to which are the inductors 14$_1$ and 14$_2$, respectively, the lateral parts being articulated to the central part by means of adjustable articulated joints 22. As may be appreciated, by varying the angular position of the parts 17b and 17c relative to the part 17a it is possible to use the same assembly 12 in combination with tubulars of different size ranging between a maximum diameter and a minimum diameter, also in the absence of one or both the inductors exemplified.

Figure 18:
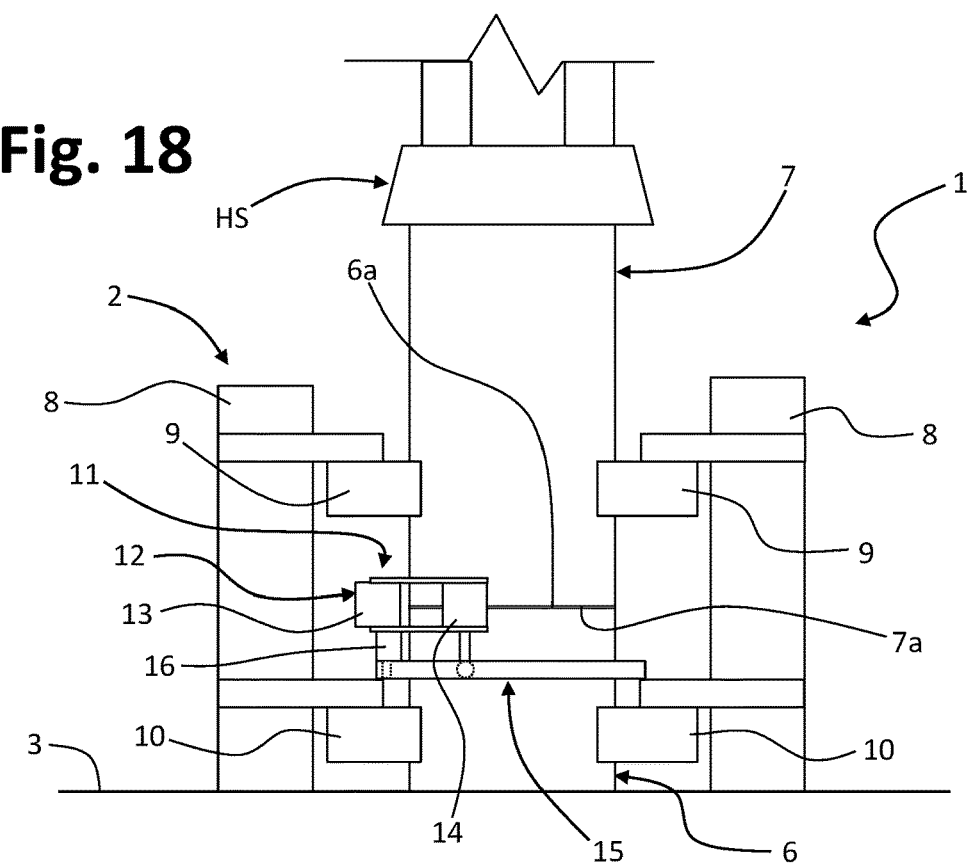
FIGS. 18 and 19 are schematic views regarding further possible variant embodiments of the invention.
Figure 19:
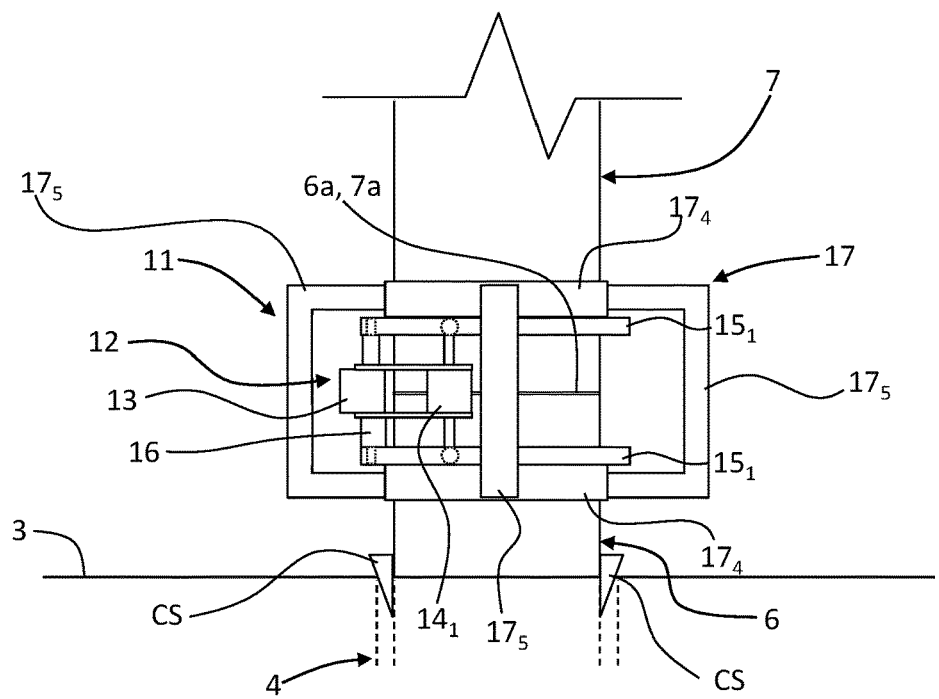

FIGS. 18 and 19 illustrates a further variants, according to which the guiding structure 15 of the assembly 12 is prearranged for having guiding parts (here only the parts 15$_1$ are visible), which extend, respectively, below and above the surfaces 6a, 7a. In embodiments of this type, the structure 17 may advantageously include supporting parts—such as those designated by 17$_4$ and 17$_5$—designed to be associated temporarily to the outer surfaces of the tubulars 6, 7 to be welded, to obtain a more stable configuration and/or blocking of the tubulars in an axially aligned position. Of course, also in an embodiment of this type a vehicle of the type as the one previously denoted by 50 may be used.

The laser head 13 and the inductor or inductors envisaged could belong to distinct sub-assemblies of the welding assembly, at least one of which is motor-driven, each sub-assembly having a movable structure of its own on the guiding support 15 or on a respective guiding support 15 that defines the necessary trajectory of revolution around the welding areas.

The invention claimed is:

1. A device for joining metallic well tubulars to be lowered into a wellbore, which comprise a first well tubular in a substantially vertical position suspended in the wellbore, with an upper end of the first well tubular outside of the wellbore, and a second well tubular in a position substantially vertical and axially aligned above the first well tubular, with a lower end surface of the second well tubular set against an upper end surface of the first well tubular, where the device comprises:

a welding arrangement for forming a circumferential weld bead at said upper and lower end surfaces of the first and second well tubulars;

a control arrangement, a holding arrangement for blocking the first and second well tubulars in said axially aligned position, the holding arrangement being configured for limiting formation of gaps and misalignments between said upper and lower end surfaces, to obtain maximum interface therebetween, wherein the welding arrangement comprises a welding assembly, which includes at least one laser welding head and at least one induction-heating device, wherein the at least one laser welding head is configured for directing a laser beam towards a circumferential working zone, which includes an upper end portion of the first well tubular and a lower end portion of the second well tubular, wherein the at least one induction-heating device is prearranged for supplying heat by induction to a corresponding part of the circumferential working zone that includes respective parts of said upper and lower end portions of the first and second well tubulars, wherein the at least one laser welding head and the at least one induction-heating device are supported by one and the same displaceable structure, with the at least one induction-heating device which is fixed in rotation with respect to the at least one laser welding head, the displaceable structure being supported by an annular frame configured for receiving therethrough at least one of the first well tubular and the second well tubular, wherein the welding arrangement further comprises a driving system, controllable for causing rotation of the displaceable structure around the circumferential working zone according to a respective trajectory of revolution, wherein the welding arrangement comprises at least one laser-radiation generator which is in a position remote from the displaceable structure and the annular frame, and is connected to the at least one laser welding head via an optical fibre, wherein the at least one induction-heating device is electrically supplied via a wiring by a supply system comprising at least one power converter that is in a position remote from the displaceable structure and the annular frame, wherein the welding arrangement moreover comprises a supporting/guiding system for the optical fibre and the wiring, configured for enabling at least one complete revolution of the displaceable structure on the annular frame, around the circumferential working zone, wherein the device also comprises a nozzle for directing a flow of an inert gas substantially at a welding area reached by the laser beam in the circumferential working zone, wherein the device further comprises a cooling system of the at least one induction-heating device, wherein the device moreover comprises a recognition system to identify the position of the welding joint, wherein the at least one induction-heating device is arranged on the displaceable structure upstream, respectively downstream, of the at least one laser welding head, with reference to the direction of revolution of the welding assembly, wherein the control arrangement is configured for controlling the welding assembly and the driving system in such a way that, during revolution of the welding assembly, the laser beam emitted by the at least one laser welding head progressively forms the circumferential weld bead; and the at least one induction-heating device supplies heat to said corresponding part of the circumferential working zone before the laser beam reaches said corresponding part, respectively after the laser beam has reached said corresponding part, wherein the holding arrangement comprises at least a first holding member and a second holding member, which are positioned above and below the welding assembly, respectively, and are separate from each other and from the annular frame, the first and second holding member being switchable between respective closed and open positions, in the closed position the first and second holding members blocking the first and second well tubulars in said axially aligned position after the lower end surface of the first well tubular has been set against the upper end surface of the second well tubular to obtain said maximum interface therebetween, wherein an actuation system is provided for actuating the first and second holding members, the actuation system being operable to switch the first holding member and the second holding member between the respective closed and open positions, and wherein the control arrangement is configured for controlling the actuation system for causing passage of the first and second holding members to the respective open positions, after the first and second well tubulars have been butt welded together by the welding arrangement.

2. The device according to claim 1, wherein:

the displaceable structure supports a first induction-heating device and a second induction-heating device, arranged respectively upstream and downstream of the at least one laser welding head, with reference to the direction of revolution of the welding assembly;

the control arrangement is configured for controlling the welding assembly and the driving system in such a way that, during revolution of the displaceable structure:

the first induction-heating device supplies heat to a first part of the circumferential working zone before the laser beam reaches said first part; and the second induction-heating device supplies heat to a second part of the circumferential working zone after the laser beam has reached said second part.

3. The device according to claim 1, wherein the annular frame has a guide that identifies said trajectory of revolution, the displaceable structure being coupled in a displaceable way to said guide, there being associated to at least one of the displaceable structure and the annular frame a motor that can be controlled for causing displacement of the displaceable structure along said guide.

4. The device according to claim 1, wherein the welding arrangement is configured for enabling adjustment of an operating position on the displaceable structure of the at least one induction-heating device relative to the first and second well tubulars and/or relative to the at least one laser welding head.

5. The device according to any claim 1, wherein the control arrangement comprises at least one control unit and a user interface for displaying and/or setting operating parameters, the operating parameters comprising one or more of the following parameters:

power of the laser beam,
speed of displacement of the welding assembly,
focal depth of the laser beam,
working frequency of the at least one induction-heating device,
intensity of the electric current for supplying the at least one induction-heating device,
sequence and/or duration of ON/OFF of the at least one induction-heating device,
radial position of the at least one induction-heating device with respect to the peripheral surface of the first and second well tubulars,
distance of the at least one induction-heating device from the at least one laser welding head along a welding circumference.

6. The device according to claim 1, wherein the welding arrangement and the holding arrangement are carried by a wheeled vehicle supporting structure configured for traveling on a running surface belonging to rig floor at which an opening of the wellbore opens.

7. A method for joining metallic well tubulars to be lowered into a wellbore, comprising the steps of:

a) providing a first well tubular having an upper end surface and a second well tubular having a lower end surface;

b) lowering the first well tubular into the wellbore, leaving the upper end thereof outside the wellbore;

c) setting the second well tubular in a position axially aligned above the first well tubular, with the lower end surface of the second well tubular against the upper end surface of the first well tubular;

d) keeping the first and second well tubulars in said axially aligned position via a first holding member and a second holding member in a blocking condition thereof, the first and second holding members belonging to a controllable holding arrangement configured for obtaining maximum interface between said lower end surface and said upper end surface, e) welding the upper end of the first well tubular to the lower end of the second well tubular, by forming a circumferential weld bead at said upper and lower end surfaces;

f) bringing the first and second holding members to a releasing condition thereof, and lowering towards the inside of the wellbore the first well tubular and the second well tubular welded together, wherein step d) comprises the operation of identifying the position of the welding joint via a recognition system, wherein step e) comprises the operations of:

providing at least one laser welding head on a displaceable structure supported by an annular frame configured for receiving therethrough at least one of the first well tubular and the second well tubular, the at least one laser welding head being configured for directing a laser beam towards a circumferential working zone that includes an upper end portion of the first well tubular and a lower end portion of the second well tubular, the at least one laser welding head being displaceable around the circumferential working zone according to a respective trajectory of revolution;

providing at least one induction-heating device on the displaceable structure and fixed in rotation with respect to the at least one laser welding head, such that the at least one induction heating device is displaceable substantially according to the trajectory of revolution of the at least one laser welding head, the at least one induction-heating device being set upstream, respectively downstream, of the at least one laser welding head, with reference to the direction of revolution of the at least one laser welding head;

supplying the at least one laser welding head by means of at least one laser-radiation generator which is in a position remote from the displaceable structure and the annular frame, the at least one laser welding head being connected to the at least one laser-radiation source via an optical fibre, electrically supplying the at least one induction-heating device via wiring by a supply system comprising at least one power converter that is in a position remote from the displaceable structure and the annular frame, supporting the optical fibre and the wiring to enable at least one complete revolution of the displaceable structure around the circumferential working zone, causing said at least one complete revolution of the displaceable structure, in such a way that:

the laser beam progressively forms the circumferential weld bead while a flow of an inert gas is directed substantially at a welding area reached by the laser beam in the circumferential working zone; and the at least one induction-heating device supplies heat to a corresponding part of the circumferential working zone, which comprises respective parts of said upper and lower end portions of the respective first and second well tubulars, before the laser beam reaches said corresponding part, respectively after the laser beam has reached said corresponding part.

8. The method according to claim 7, wherein the at least one induction-heating device comprises a first induction-heating device and a second induction-heating device, which are both supported by the displaceable structure, to be rotatable substantially according to said trajectory of revolution, respectively upstream and downstream of the at least one laser welding head, with reference to the direction of revolution of the at least one laser welding head, in such a way that, during revolution of the at least one laser welding head, the first induction-heating device and the second induction-heating device:

the first induction-heating device supplies heat to a first part of the circumferential working zone before the laser beam reaches said first part; and the second induction-heating device supplies heat to a second part of the circumferential working zone after the laser beam has reached said second part.

9. A device for joining metallic well tubulars to be lowered into a wellbore, which comprise a first well tubular in a substantially vertical position suspended in the wellbore, with an upper end of the first well tubular outside of the wellbore, and a second well tubular in a position substantially vertical and axially aligned above the first well tubular, with a lower end surface of the second well tubular against an upper end surface of the first well tubular, wherein the device comprises:

a welding arrangement for forming a circumferential weld bead in a position corresponding to said upper and lower end surfaces of the first and second well tubulars, a control arrangement, wherein the welding arrangement comprises a welding assembly which includes at least one laser welding head, wherein the at least one laser welding head is configured for directing a laser beam towards a circumferential working zone that includes an upper end portion of the first well tubular and a lower end portion of the second well tubular, wherein the welding arrangement further comprises a driving system, controllable for displacing the welding assembly around the circumferential working zone according to a respective trajectory of revolution, wherein the control arrangement is configured for controlling the welding assembly and the driving system in such a way that, during rotation of the welding assembly, the laser beam emitted by the at least one laser welding head progressively forms the circumferential welding bead, and wherein the device further comprises a movable wheeled vehicle supporting structure that bears at least the welding assembly, the movable wheeled vehicle supporting structure being movable on a running surface belonging to a rig floor at which an opening of the wellbore opens, between an inoperative position and an operative position, which are generally far and generally close, respectively, with respect to the circumferential working zone, the movable wheeled vehicle supporting structure being designed to be travel on said running surface of the rig floor in a direction generally perpendicular with respect to an axis of the wellbore.

10. The device according to claim 9, wherein the movable wheeled vehicle supporting structure comprises a wheeled motorized vehicle.

11. The device according to claim 9, wherein the movable wheeled vehicle supporting structure is prearranged to be mounted movable on guides or tracks which define said running surface and are provided on a-said rig floor, the guides or tracks extending in said direction generally perpendicular with respect to said axis of the wellbore.

12. The device according to claim 9, wherein the welding arrangement comprises at least one induction-heating device prearranged to supply heat by induction to at least one corresponding part of said upper end portion of the first well tubular and/or of said lower end portion of the second well tubular, wherein:

the at least one induction-heating device is prearranged to supply heat by induction to a corresponding part of the circumferential working zone that includes respective parts of said upper and lower end portions of the first and second well tubulars, and the at least one induction-heating device is arranged on the welding assembly upstream, respectively downstream, of the at least one laser welding head, with reference to the direction of revolution of the welding assembly, in such a way that, during revolution of the welding assembly, the at least one induction-heating device supplies heat to said corresponding part of the circumferential working zone before the laser beam reaches said corresponding part, respectively after the laser beam has reached said corresponding part.

13. The device according to claim 12, wherein on the movable wheeled vehicle supporting structure are installed one or more components of at least one of a supply system and a cooling system of the at least one induction-heating device.

14. The device according to claim 9, wherein on the movable wheeled vehicle supporting structure are installed one or more components of at least one of a power system and a cooling system of the at least one laser welding head.

15. The device according to claim 9, further comprising a holding arrangement for blocking the first and second well tubulars in said axially aligned position, the holding arrangement comprising first and second holding members borne by the movable wheeled vehicle supporting structure and configured to assume a holding position and a release position, in the release position the movable wheeled vehicle supporting structure being displaceable between the inoperative position and the operative position.

16. The device according to claim 9, wherein:
the driving system comprises a substantially annular guiding support, prearranged for receiving therethrough the first well tubular and/or the second well tubular, the guiding support defining a guide that defines said trajectory of revolution, the welding assembly being coupled in a displaceable way to said guide, to at least one of the welding assembly and the guiding support there being preferably associated a motor that is controllable to cause displacement of the welding assembly along said guide, the guiding support comprises at least two guide parts mutually coupleable and borne by the movable supporting structure, the at least two guide parts being configured to assume a closed position and an open position, in the open position the movable wheeled vehicle supporting structure being displaceable between the inoperative position and the operative position.

17. The device according to claim 9, wherein the movable wheeled vehicle supporting structure has at least one of:
a recognition system configured for locating position of the upper end surface of the first well tubular and the lower end surface of the second well tubular,
a system for measuring and/or controlling in real time properties of the welding beads.

18. The device according to claim 9, comprising a control system for controlling at least displacements of the movable wheeled vehicle supporting structure between the inoperative position and the operative position.

19. The device according to claim 9, wherein the movable wheeled vehicle supporting structure has a number of movement members, such as wheels or the like, resting directly on the rig floor or else being coupled with guides or track provided on the rig floor.

* * * * *